US011453515B2

(12) United States Patent
Henson et al.

(10) Patent No.: US 11,453,515 B2
(45) Date of Patent: Sep. 27, 2022

(54) ELECTROSTATIC FIELD GENERATOR FOR SPACECRAFT

(71) Applicant: The Boeing Company, Chicago, IL (US)

(72) Inventors: Landon Henson, Snoqualmie, WA (US); Mark Wilenski, Mercer Island, WA (US); James Russell, Bellevue, WA (US)

(73) Assignee: The Boeing Company, Chicago, IL (US)

( * ) Notice: Subject to any disclaimer, the term of this patent is extended or adjusted under 35 U.S.C. 154(b) by 960 days.

(21) Appl. No.: 16/156,813

(22) Filed: Oct. 10, 2018

(65) Prior Publication Data

US 2020/0115070 A1 Apr. 16, 2020

(51) Int. Cl.
 *B64G 1/54* (2006.01)
 *B64G 3/00* (2006.01)
(52) U.S. Cl.
 CPC ............. *B64G 1/543* (2013.01); *B64G 1/546* (2013.01); *B64G 3/00* (2013.01)
(58) Field of Classification Search
 CPC .......... B64G 1/54; B64G 1/543; B64G 1/546; B64G 1/12; B64G 9/00; B64G 1/222
 See application file for complete search history.

(56) References Cited

U.S. PATENT DOCUMENTS

| 6,476,317 | B1* | 11/2002 | Frederickson | G21F 1/12 |
| | | | | 174/350 |
| 9,469,421 | B1* | 10/2016 | Pamfiloff | G21H 1/02 |
| 9,728,289 | B1* | 8/2017 | Poggi | G21F 1/00 |
| 10,583,939 | B2* | 3/2020 | Williams | B64G 1/543 |
| 10,815,016 | B2* | 10/2020 | Williams | B64G 1/648 |
| 11,136,147 | B2* | 10/2021 | Russell | B64G 1/54 |
| 2012/0318928 | A1* | 12/2012 | Bigelow | B64G 1/54 |
| | | | | 244/171.7 |
| 2015/0213909 | A1* | 7/2015 | Wiedemann | G21F 1/12 |
| | | | | 250/515.1 |
| 2018/0281995 | A1* | 10/2018 | Williams | B64G 1/648 |

(Continued)

FOREIGN PATENT DOCUMENTS

RU 2406661 C2 * 12/2010

OTHER PUBLICATIONS

Spacecraft Electrostatic radiation Shielding, KSC Technology Development and Applications 2006-2207.*

(Continued)

*Primary Examiner* — Philip J Bonzell
(74) *Attorney, Agent, or Firm* — Kunzler Bean & Adamson

(57) ABSTRACT

Apparatus, systems, and methods for protecting a vehicle from a radiation source (e.g., the sun) are provided. One apparatus includes a set of first wires and a set of second wires located proximate to the set of first wires. The set of first wires maintains a positive voltage and the set of second wires maintains a negative voltage. The set of first wire and the set of second wires are arranged to generate an electrostatic field (ESF) between the vehicle and the radiation source. A system includes a spacecraft and a field generator that generates an ESF between the spacecraft and a radiation source. A method includes tracking a location of a spacecraft relative to a radiation source and generating an ESF between the spacecraft and the radiation source.

20 Claims, 35 Drawing Sheets

(56) References Cited

U.S. PATENT DOCUMENTS

2020/0094995 A1\* 3/2020 Russell .................. B64G 1/222
2020/0270000 A1\* 8/2020 Williams ............... B64G 1/648

OTHER PUBLICATIONS

Electrostatic Space Radiation Shielding, Advances in Space Research. vol. 42, Issue 6, Sep. 15, 2008.\*
Meeting the Grand Challenge of Protecting Astonaut's Health: Electrostatic Active Space Radiation Shielding for Deep Space Missions. NASA NIAC 2011.\*

\* cited by examiner

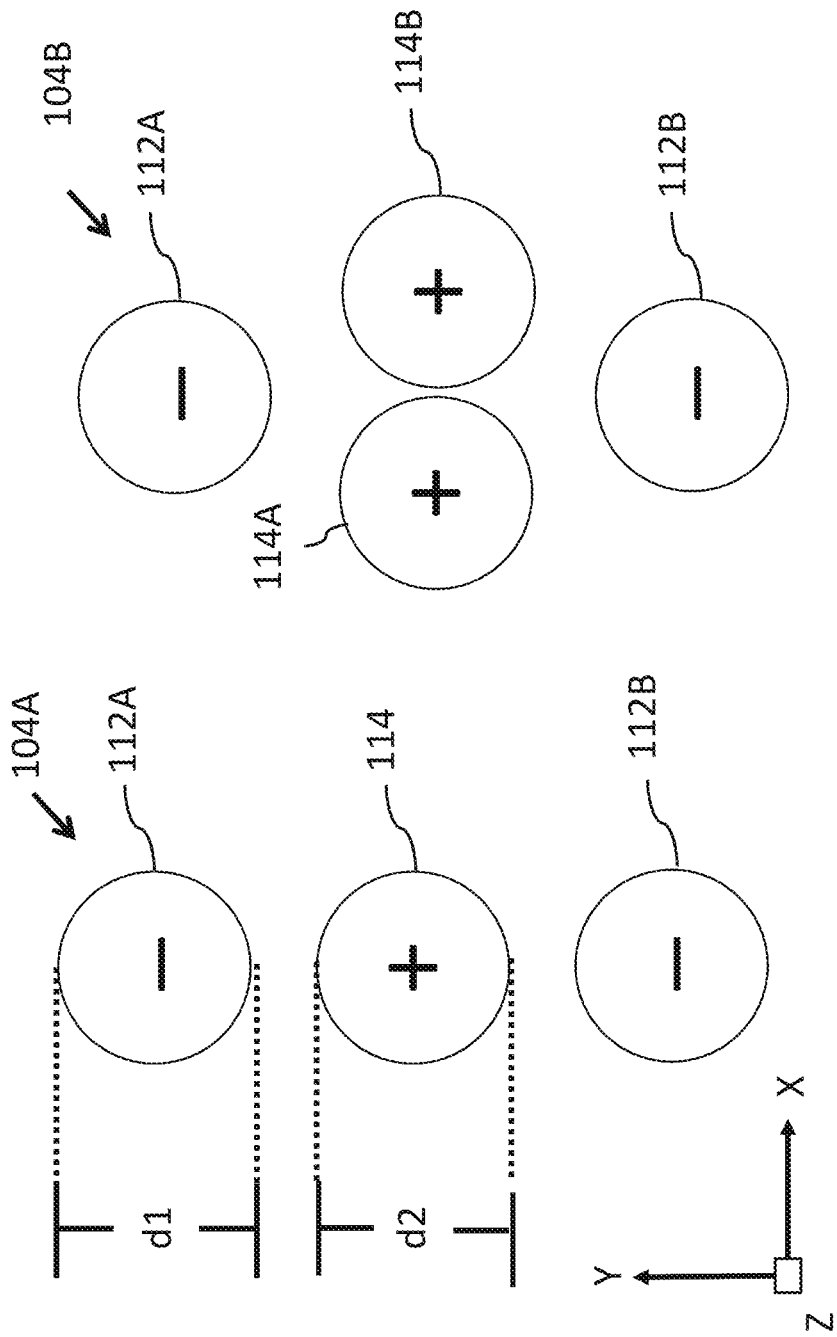

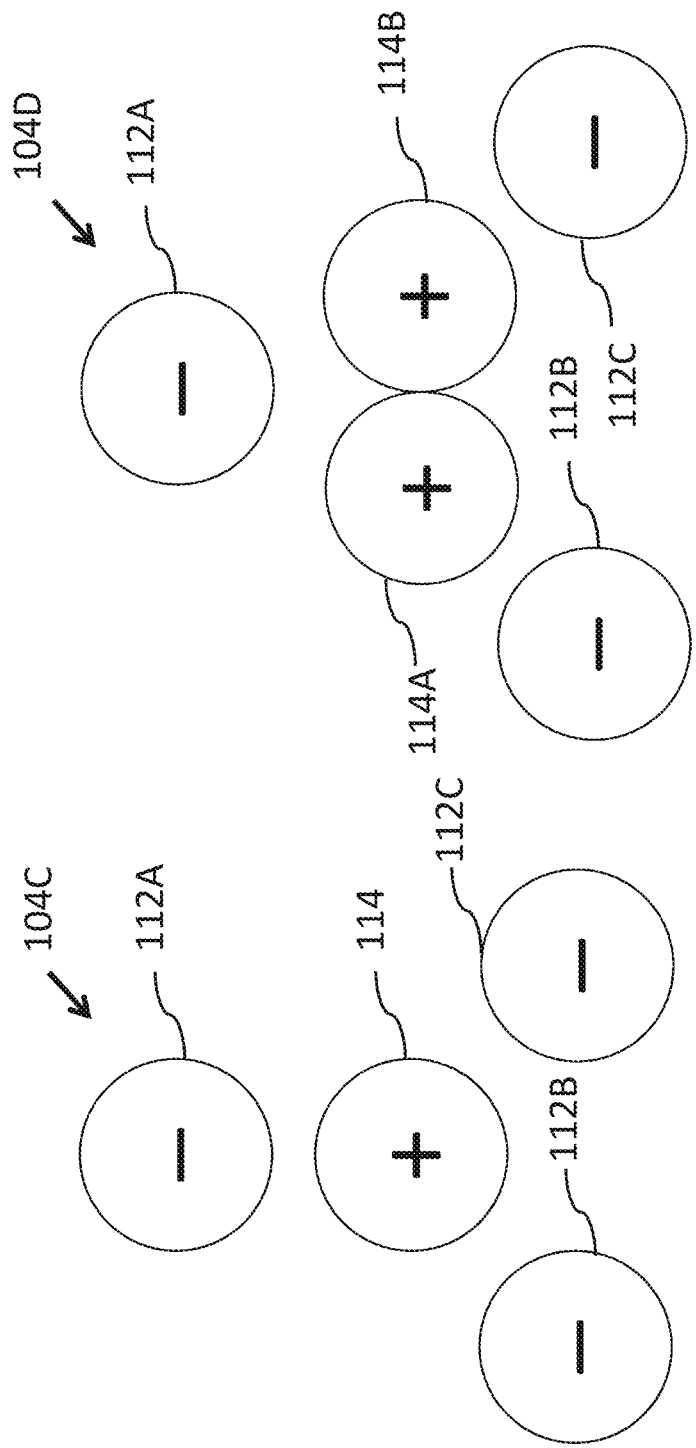

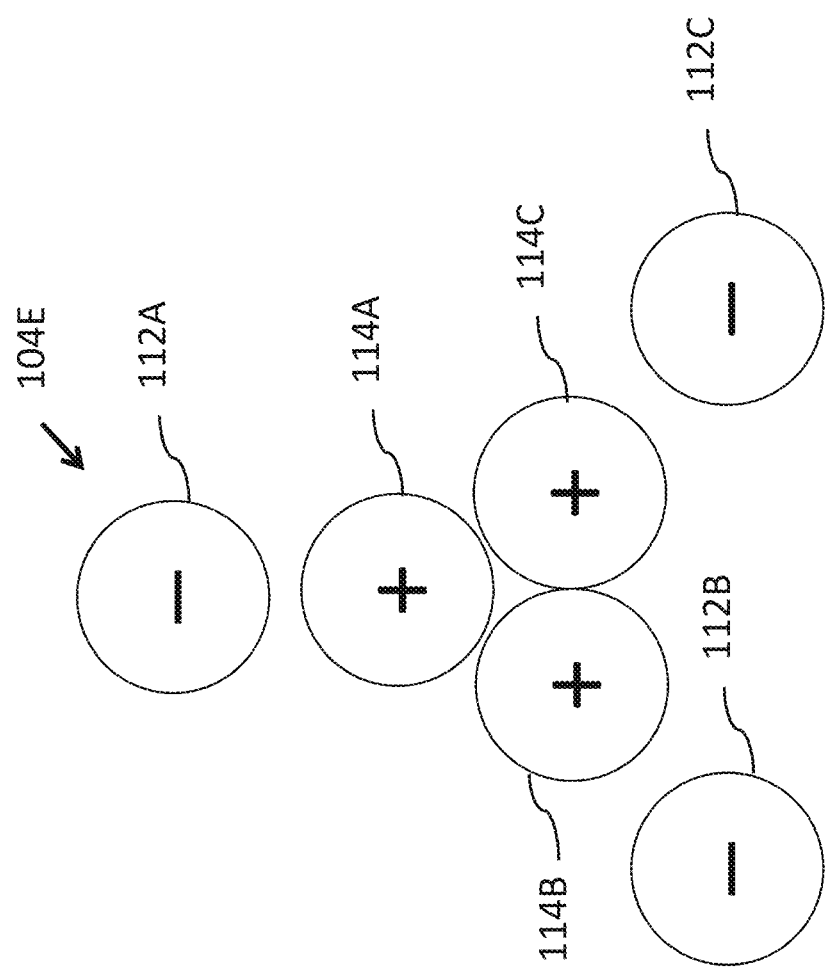

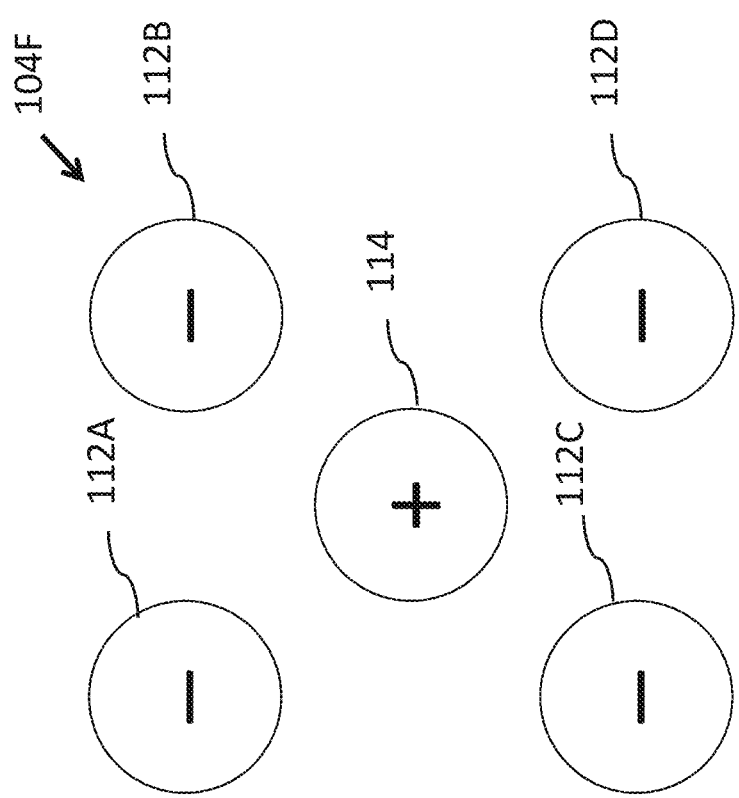

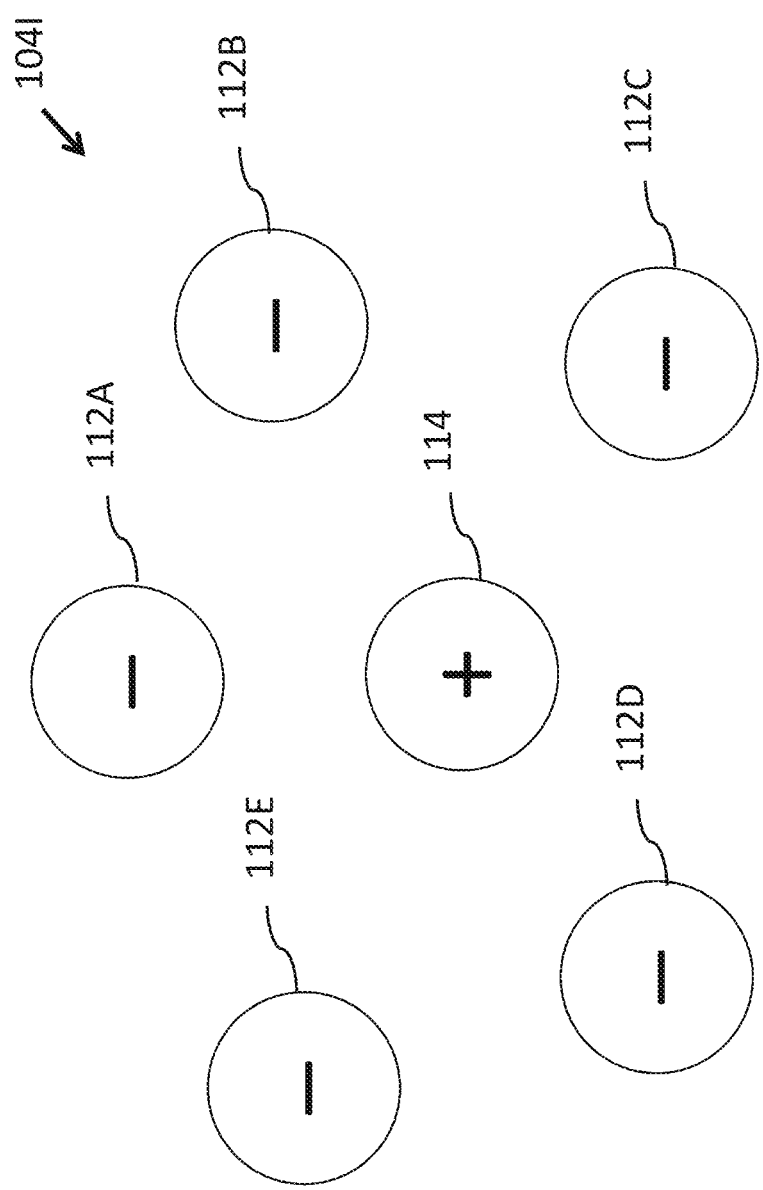

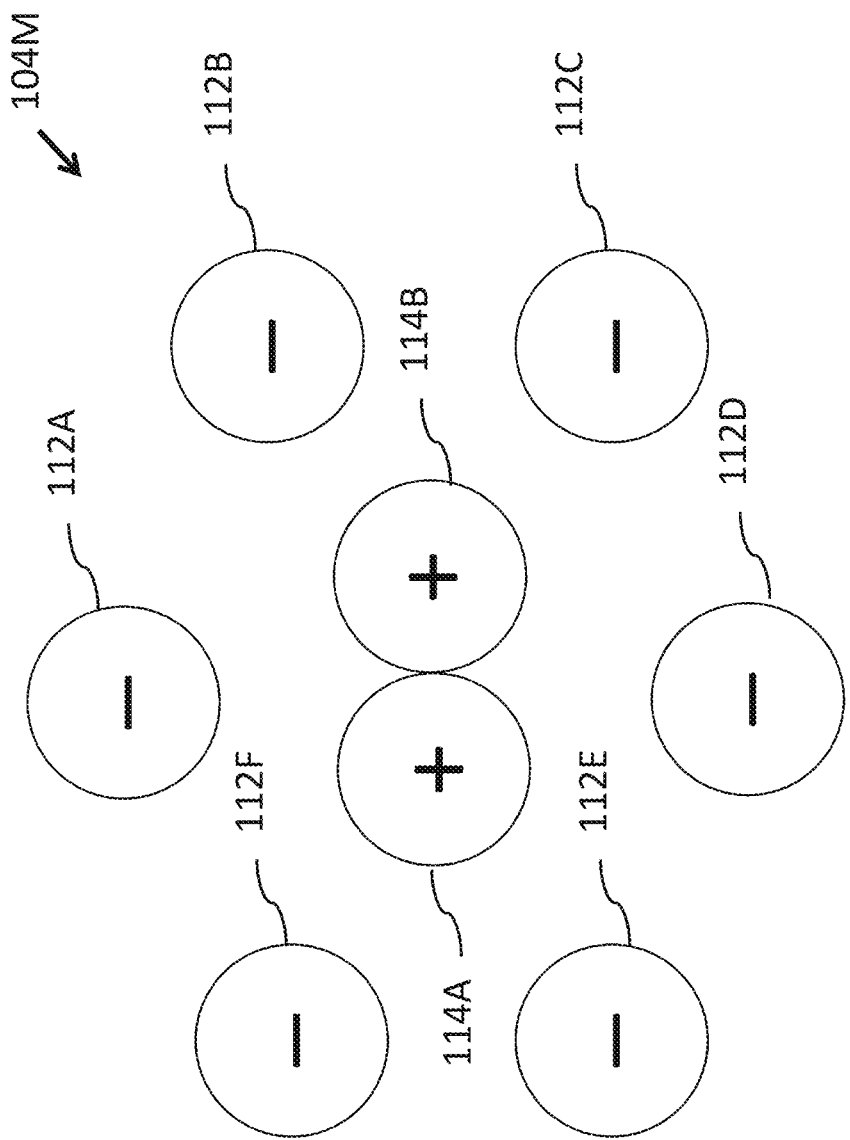

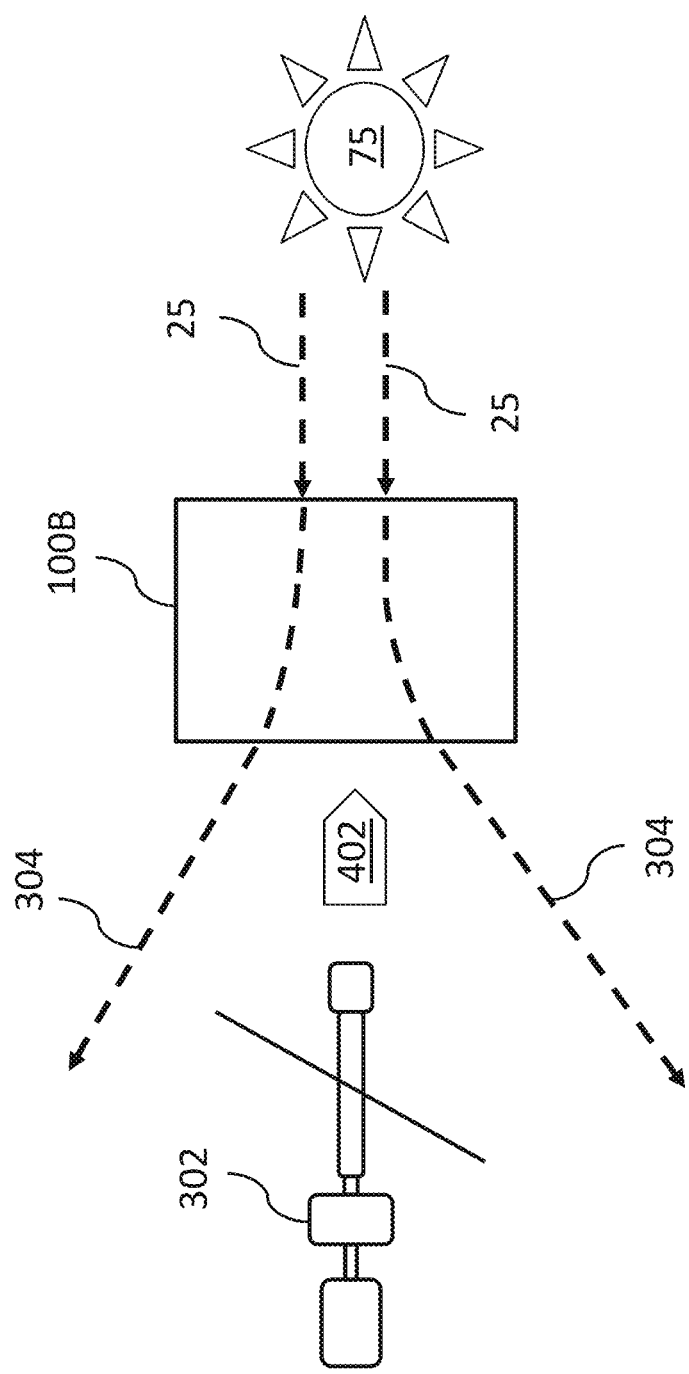

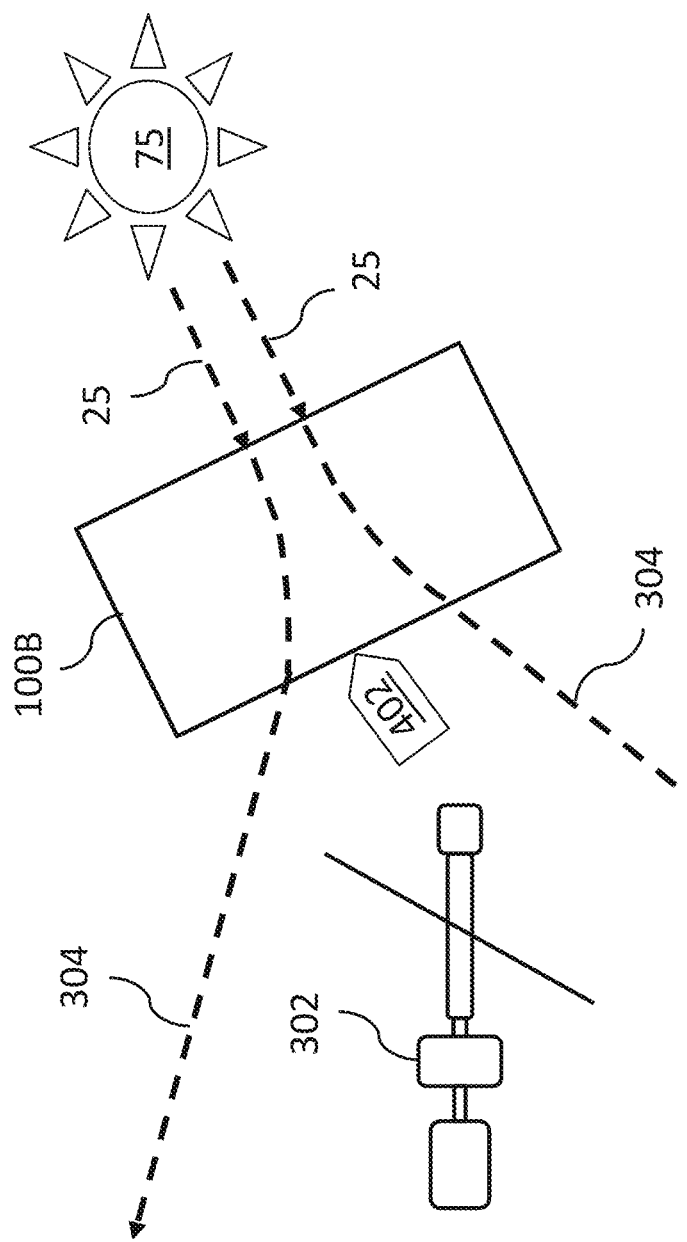

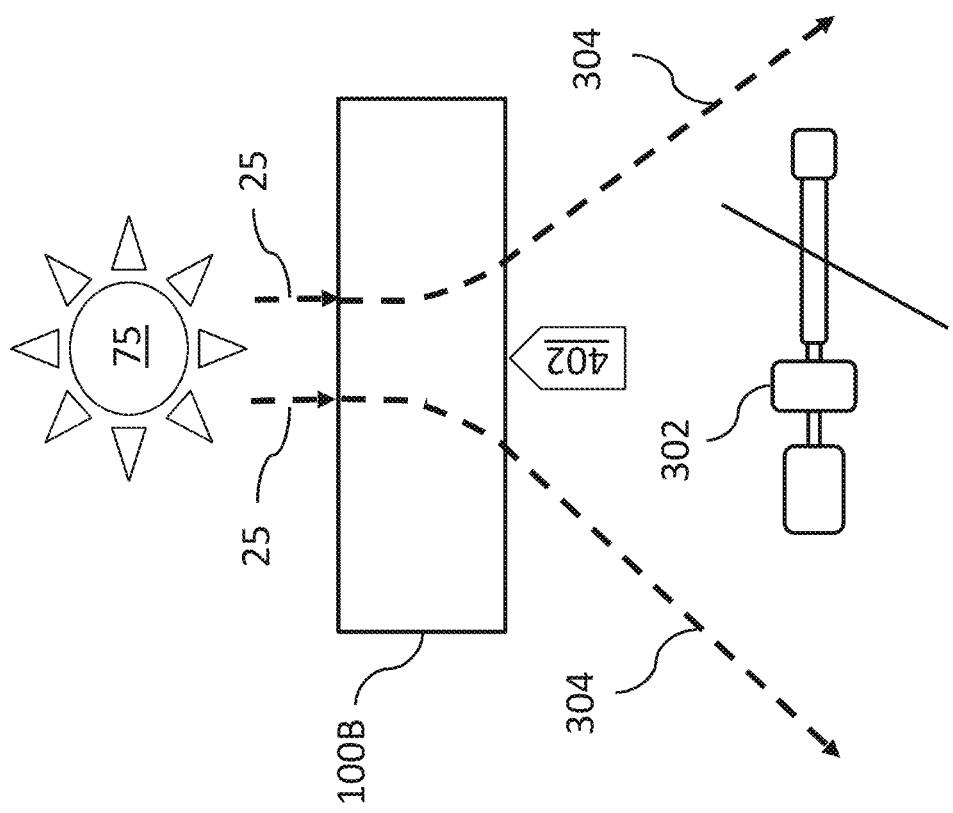

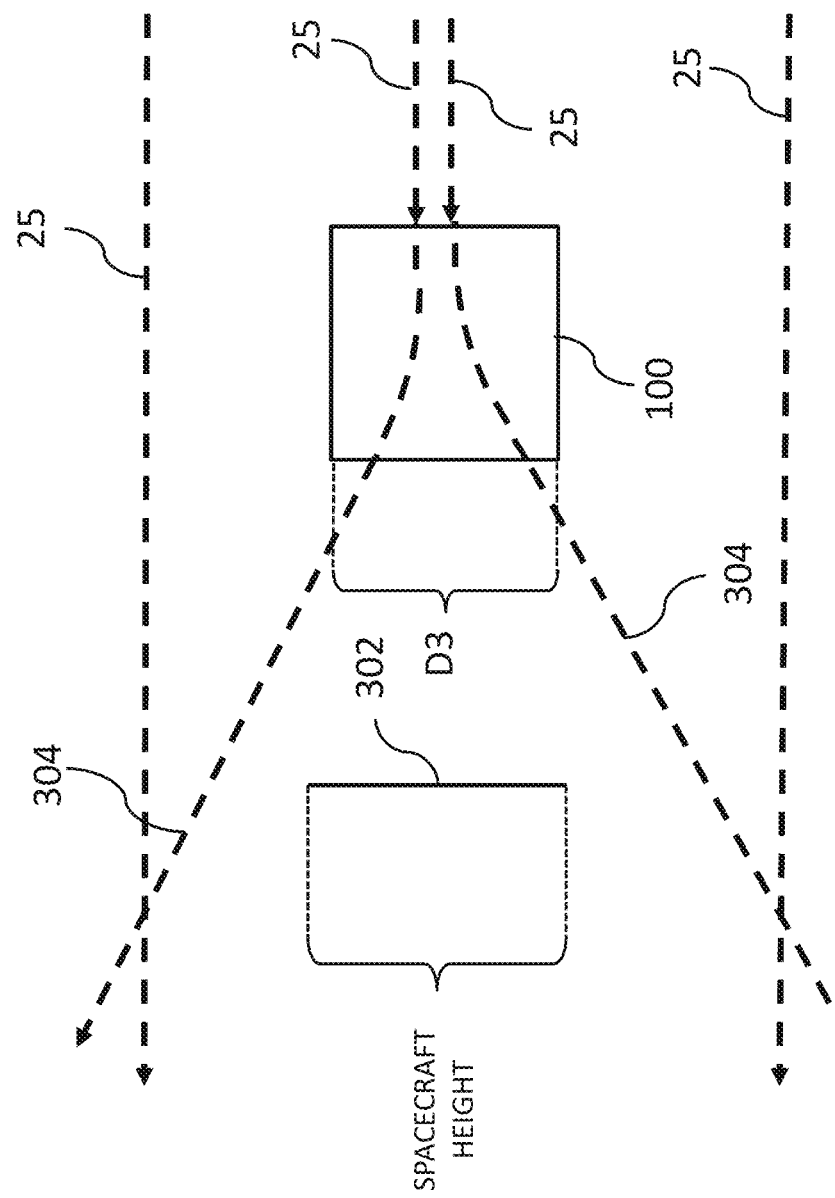

ELECTROSTATIC FIELD GENERATOR FOR SPACECRAFT

FIELD

This disclosure relates generally to an electrostatic field (ESF) generator, and more particularly, to an ESF generator that protects spacecraft from high-energy particles (e.g., radiation) released from a radiation source (e.g., the sun).

BACKGROUND

During space travel, spacecraft leave the protection of the Earth's magnetic field and are exposed to high-energy charged particles (e.g., radiation) from the sun. During coronal mass ejections (CME) events associated with solar flares, for example, high-energy particles can impact a spacecraft with levels of radiation that may be lethal to a human within a relatively short amount of time. Without protection against randomly occurring CME events, venturing beyond the Earth's protective magnetic field can pose significant risks for space travelers, which may make space travel impractical.

SUMMARY

The subject matter of the present application has been developed in response to the present state of the art, and in particular, in response to the shortcomings of previous techniques to protect spacecraft from radiation during space travel, that have not yet been fully solved by the currently available techniques. Accordingly, the subject matter of the present application has been developed to provide an electrostatic field (ESF) generator for spacecraft and associated method that overcome at least some of the above-discussed shortcomings of previous techniques. More specifically, in some examples, the ESF generator of the present disclosure can provide greater protection for a spacecraft from high-energy particles and/or radiation compared to previous apparatus, systems, and methods.

Disclosed herein is an apparatus that includes a set of first wires and a set of second wires located proximate to the set of first wires. The set of first wires maintains a positive voltage and the set of second wires maintains a negative voltage. The set of first wires and the set of second wires are arranged to generate an ESF between a vehicle (e.g., a spacecraft) and a radiation source (e.g., the sun).

Some apparatus include a set of second wires including two or more second wires. Additional or alternative apparatus include the at least two second wires of the set of second wires located on opposite sides of the set of first wires. Further, some of the at least two second wires are arranged to be in parallel with respect to the set of first wires.

In alternative or additional apparatus, the set of second wires comprises at least three second wires and the at least three second wires are arranged to include a triangular pattern. Here, the set of first wires are located within the triangular pattern.

In further alternative or additional apparatus, the set of second wires comprises at least four second wires in which the at least four second wires are arranged to include a quadrilateral pattern. Here, the set of first wires can be located within the quadrilateral pattern. Further aspects provide that the quadrilateral pattern includes a square pattern and the set of first wires are located at a center of the square pattern.

In yet further additional or alternative apparatus, the set of second wires comprises at least five second wires and the at least five second wires are arranged to include a geometric pattern including at least five sides. Here, the set of first wires can be located within the geometric pattern.

In some apparatus, the set of first wires comprises a plurality of first wires. The two or more first wires can provide redundancy to an apparatus in the unlikely event that one or more of the first wires becomes otherwise inoperable.

The ESF include first width and height dimensions and the vehicle includes second width and height dimensions. In various apparatus, the first width and height dimensions of the ESF are greater than or equal to the second width and height dimensions of the vehicle.

In some apparatus, the set of first wires includes at least one first wire and the set of second wires includes at least one second wire coiled around the first wire. In further embodiments, the set of first wires includes at least one first wire and the set of second wires includes at least one second wire including a mesh configuration around the first wire.

Various embodiments further provide spacecraft systems. At least one system includes a spacecraft and a field generator for protecting the spacecraft from a radiation source. The field generator includes a set of first wires maintaining a positive voltage and a set of second wires maintaining a negative voltage in which the set of first wire and the set of second wires are arranged to generate an ESF.

Some systems further include a tracking module that tracks a location of the spacecraft relative to the radiation source and a positioning module that positions the field generator based on the tracked location of the spacecraft to generate the ESF between the spacecraft and the radiation source. In some aspects, the positioning module is further configured to re-position the field generator relative to the spacecraft and the radiation source as the spacecraft travels to maintain the ESF between the spacecraft and the radiation source.

In some systems, at least two second wires of the set of second wires are located on opposite sides of the set of first wires and the at least two second wires are stacked in parallel with respect to the set of first wires. In additional or alternative systems, the set of second wires includes at least three second wires in which the at least three second wires are arranged to comprise a geometric pattern including at least three sides and the set of first wires are located within an area defined by the as least three sides of the geometric pattern.

The ESF includes first width and height dimensions and the spacecraft includes second width and height dimensions. In additional or alternative systems, the first width and height dimensions are equal to the second width and height dimensions. In further additional or alternative systems, the first width and height dimensions are greater than the second width and height dimensions.

Various embodiments further provide methods for protecting a spacecraft from a radiation source. One method includes determining a location of the spacecraft relative to the radiation source and generating an electrostatic field (ESF) between the spacecraft and the radiation source. Here, the ESF is generated via a field generator comprising a set of first wires maintaining a positive voltage and a set of second wires maintaining a negative voltage. Some methods further include determining a location of the spacecraft relative to the radiation source as the spacecraft travels and re-positioning the field generator relative to the spacecraft and the radiation source as the spacecraft travels to maintain the ESF between the spacecraft and the radiation source.

BRIEF DESCRIPTION OF THE DRAWINGS

In order that the advantages of the subject matter may be more readily understood, a more particular description of the subject matter briefly described above will be rendered by reference to specific embodiments that are illustrated in the appended drawings. Understanding that these drawings depict only typical embodiments of the subject matter and are not therefore to be considered to be limiting of its scope, the subject matter will be described and explained with additional specificity and detail through the use of the drawings, in which:

FIGS. 4A through 4C are schematic diagrams of a spacecraft utilizing an ESF generator of FIG. 1 to protect the spacecraft from radiation released from a radiation source, according to one or more examples of the present disclosure;

FIGS. 8A through 8D are diagrams illustrating an ESF generated by an ESF generator of FIG. 1 with multiple wires conducting negative voltage and one or more wires conducting positive voltage to generate an ESF and positioned various distances apart, according to various embodiments of the present disclosure;

DETAILED DESCRIPTION

Reference throughout this specification to "one embodiment," "an embodiment," or similar language means that a particular feature, structure, or characteristic described in connection with the embodiment is included in at least one embodiment of the present disclosure. Appearances of the phrases "in one embodiment," "in an embodiment," and similar language throughout this specification may, but do not necessarily, all refer to the same embodiment. Similarly, the use of the term "implementation" means an implementation having a particular feature, structure, or characteristic described in connection with one or more embodiments of the present disclosure, however, absent an express correlation to indicate otherwise, an implementation may be associated with one or more embodiments.

In addition, as used herein, the term "set" can mean "one or more," unless expressly specified otherwise. The term "sets" can mean multiples of or a plurality of "one or mores," "ones or more," and/or "ones or mores" consistent with set theory, unless expressly specified otherwise.

Figure 1A:
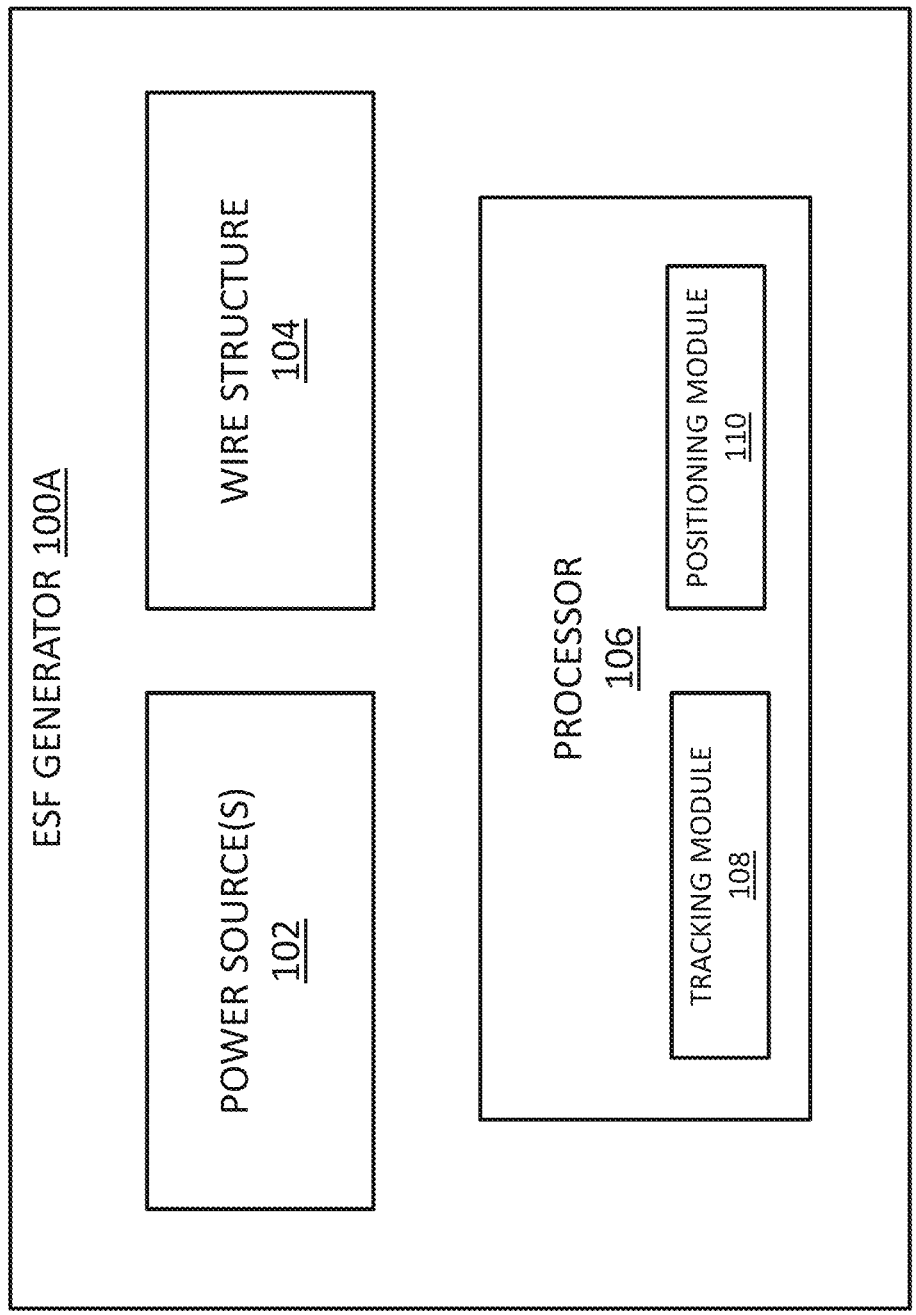
FIGS. 1A and 1B are schematic block diagrams of an electrostatic field (ESF) generator, according to two or more embodiments of the present disclosure.

Referring now to the drawings, FIG. 1A is a diagram of an embodiment of an electrostatic field (ESF) generator 100A. At least in the illustrated embodiment, an ESF generator 100A includes, among other components, a set of power sources 102 (e.g., one or more power sources 102) and a wire structure 104.

A power source 102 may include any suitable hardware and/or software that can supply power (e.g., direct current (DC) power) to a wire structure 104. In some embodiments, a power source 102 can supply a negative voltage (−) and/or a positive voltage (+) to the wire structure 104.

In some embodiments, a power source 102 may include a nuclear source of power. In other embodiments, a power source 102 may include a solar power source (e.g., an array of solar cells). In yet other embodiments, the power source 102 may be coupled to and receive power from a spacecraft.

Figure 1B:
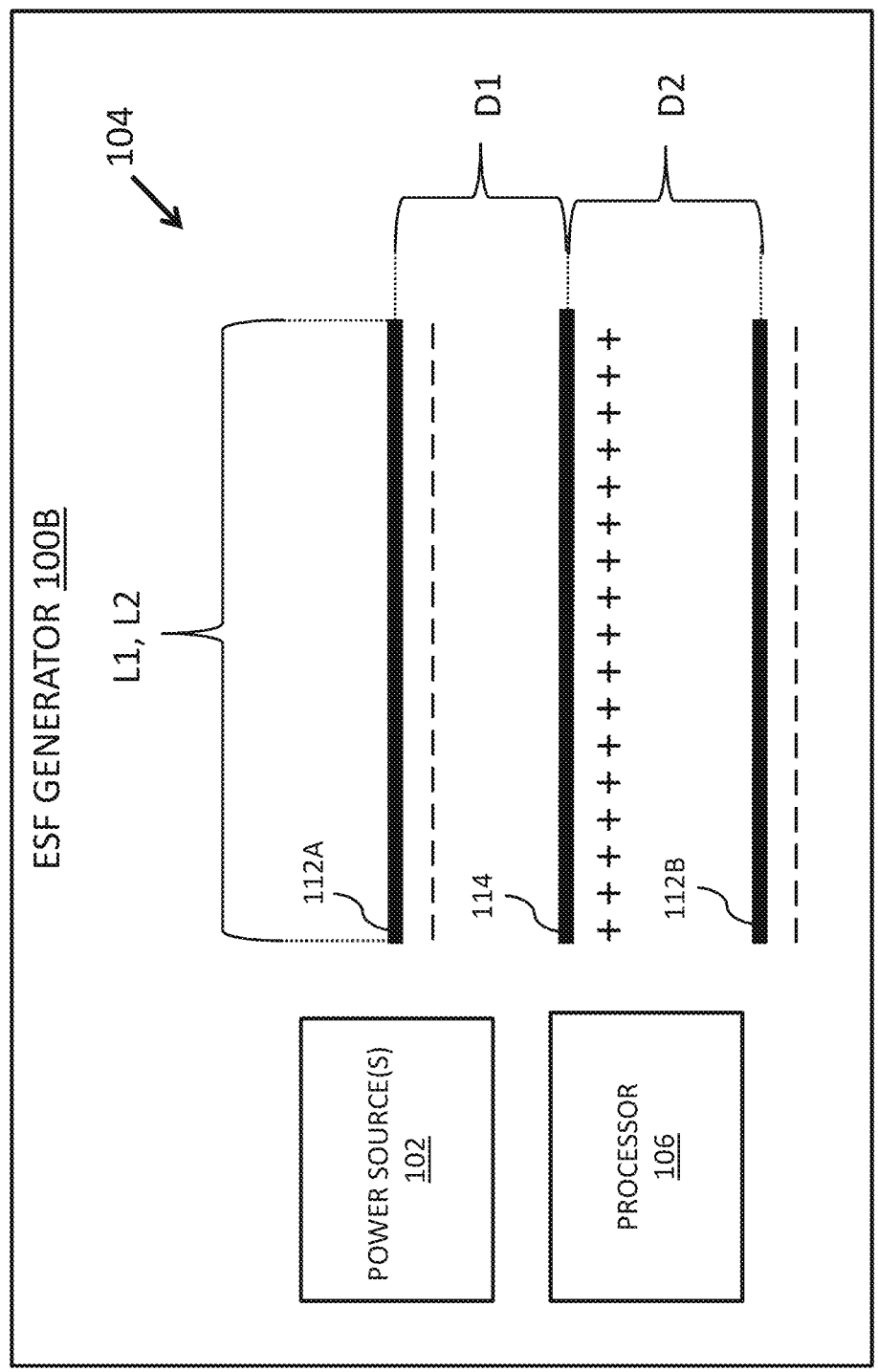

A wire structure 104 may include any suitable hardware and/or software that can generate and/or create an ESF in response to receiving power from the power source 102. With reference to FIG. 1B, FIG. 1B is a diagram illustrating one embodiment of a wire structure 104. While the wire structure 104 illustrated in FIG. 1B shows a particular configuration, a wire structure 104 is not limited to this embodiment. That is, various other embodiments can include different structures and/or configurations, as discussed herein (see e.g., FIGS. 2A through 2O).

In FIG. 1B, a wire structure 104 can include a plurality of wires 112 and a set of wires 114. At least in the illustrated embodiment, a wire structure 104 can include, among other components, a plurality of wires 112 (e.g., two or more wires 112) and a set of wires 114 (e.g., one or more wires 114). Other embodiments, can include different quantities of wires 112 and/or wires 114.

In some embodiments, the power source(s) 102 can supply negative voltage (−) to the plurality of wires 112 and positive voltage (+) to the set of wires 114. In additional or alternative embodiments, one or more power sources 102 can supply negative voltage to the plurality of wires 112 and one or more additional power sources 114 can supply positive voltage (+) to the set of wires 114.

A plurality of wires 112 may include any suitable quantity of wires 112 greater than or equal to two wires 112 that, in combination with a set of wires 114, can create and/or generate an ESF. At least in the illustrated embodiment, the plurality of wires 112 includes a wire 112A and a wire 112B (also simply referred individually, in various groups, or collectively as wire(s) 112). In various other embodiments, a plurality of wires 112 can include three wires 112, four wires 112, five wires 112, or six wires 112, among other quantities of wires 112 that are possible and contemplated herein that are greater than six wires 112. Including more than two wires 112 can provide redundancy to the ESF generator 100 in the unlikely event that one or more wires 112 goes offline or otherwise becomes inoperable.

In various embodiments, a wire 112 possesses and/or maintains a negative voltage (−) and may include any suitable structure that can possess a negative voltage. Example structures may include, but are not limited to, a wire, a rod, a bar, a pole, a shaft, a cable, a coil, a line, and/or a thread, etc., among other structures that can hold and/or possess a charge that are possible and contemplated herein.

A wire 112 may include and/or be formed of any suitable material that can include, possess, and/or maintain a negative voltage. Example materials may include, but are not limited to, a metal, an alloy, a semi-conductive material, a conductive polymer, graphite, a superconductor (e.g., a metal, a ceramic, an organic material, etc.), etc., among other materials that are possible and contemplated herein.

Further, a wire 112 can include any suitable length L1 that can facilitate creating and/or generating an ESF. In various embodiments, the length L1 can be in the range of about 10 meters to about 10 kilometers or more.

In some embodiments, each wire 112 in a plurality of wires 112 includes the same or substantially the same length L1. In alternative embodiments, at least two wires 112 in a plurality of wires 112 include different or substantially different lengths L1. In further alternative embodiments, each wire 112 in a plurality of wires 112 includes different or substantially different lengths L1.

A wire 112 can include any suitable diameter d1 (see e.g., FIG. 2A) and/or other dimensions that can facilitate creating and/or generating an ESF. In various embodiments, the diameter d1 can be in the range of about 0.1 millimeters to about 100 millimeters or more.

In some embodiments, each wire 112 in a plurality of wires 112 includes the same or substantially the same diameter d1. In alternative embodiments, at least two wires 112 in a plurality of wires 112 include different or substantially different diameters d1. In further alternative embodiments, each wire 112 in a plurality of wires 112 includes different or substantially different diameters d1.

A wire 112 can possess, maintain, and/or hold any suitable amount of negative voltage that can facilitate creating and/or generating an ESF. In various embodiments, a wire 112 can possess, maintain, and/or hold a negative voltage in the range of about 100 volts to about 1 MV, among other voltages and/or ranges of voltages that are possible and contemplated herein. In some embodiments, a wire 112 can possess, maintain, and/or hold up to about 20 kV. In other embodiments, a wire 112 can possess, maintain, and/or hold up to about 50 kV. In additional or alternative embodiments, a wire 112 can possess, maintain, and/or hold up to about 100 kV. In further additional or alternative embodiments, a wire 112 can possess, maintain, and/or hold up to about 500 kV. In still further additional or alternative embodiments, a wire 112 can possess, maintain, and/or hold up to about 1 MV, among other voltages that are possible and contemplated herein.

The amount of negative voltage maintained, possessed, and/or held by a wire 112 depends on the length L1 of the wire 112. In some embodiments, the longer the length L1, the smaller the amount of negative voltage that the wire 112 maintains, possesses, and/or holds since there is a greater amount of time and/or distance to alter the path 304 of the potentially harmful particles (e.g., radiation) from a radiation source 75. In other words, because a smaller change in angular displacement per unit wire length is needed for a wire 112 with a longer length L1 to alter the path 25 (e.g., a non-altered path) of the radiation, a smaller amount of negative voltage can be utilized in the wire 112 to alter the path 25 of the radiation to the altered path 304 since there is more distance/time for the ESF to act on the radiation.

Conversely, the shorter the length L1, the greater the amount of negative voltage that the wire 112 can possess, maintain, and/or hold. That is, greater amounts of negative voltage may be utilized in shorter lengths L1 since there is a smaller amount of time and/or distance to alter the path 25 of the potentially harmful particles (e.g., radiation) from a radiation source 75. In other words, because a larger change in angular displacement per unit wire length is needed for a wire 112 with a shorter length L1 to alter the path 25 of the radiation, a larger amount of negative voltage can be utilized in the wire 112 to alter the path 25 of the radiation to the altered path 304 since there is less distance/time for the ESF to act on the radiation.

In various embodiments, a length L1 and/or amount of negative voltage may be selected based on the weight of the wire 112, which can be largely dependent on the type of material utilized. That is, with heavier materials, shorter lengths L1 and/or smaller diameters d1 and a greater amount of negative voltage may be preferred to balance system weight, power, and size constraints. Similarly, lighter materials may allow longer lengths L1 and/or larger diameters d1 and a smaller amount of negative voltage. In other words, various embodiments may allow various parameters based on weight, length, and/or power factors.

A set of wires 114 may include any suitable quantity of wires 114 greater than or equal to one wire 114 that, in combination with a plurality of wires 112, can create and/or generate an ESF. At least in the illustrated embodiment, the set of wires 114 includes one wire 114. In various other embodiments, a set of wires 114 can include two wires 114 or three wires 114, among other quantities of wires 114 that are possible and contemplated herein that are greater than three wires 114. Including more than one wire 114 can provide redundancy to the ESF generator 100 in the unlikely event that one or more wires 114 goes offline or otherwise becomes inoperable.

In various embodiments, a wire 114 possesses, maintains, and/or holds a positive voltage (+) and may include any suitable structure that can possess, maintain, and/or hold a positive voltage. Example structures may include, but are not limited to, a wire, a rod, a bar, a pole, a shaft, a cable, a line, and/or a thread, etc., among other conductive structures that are possible and contemplated herein.

A wire 114 may include and/or be formed of any suitable material that can possess, maintain, and/or hold a positive voltage. Example materials may include, but are not limited to, a metal, an alloy, a semi-conductive material, a conductive polymer, graphite, a superconductor (e.g., a metal, a ceramic, an organic material, etc.), etc., among other materials that are possible and contemplated herein.

Further, a wire 114 can include any suitable length L2 that can facilitate creating and/or generating an ESF. In various embodiments, the length L12 can be in the range of about 10 meters to about 10 kilometers or more.

In some embodiments, each wire 114 in a set of wires 114 with two or more wires 114 includes the same or substantially the same length L2. In alternative embodiments, at least two wires 114 in a set of wires 114 include different or substantially different lengths L2. In further alternative embodiments, each wire 114 in a set of wires 114 includes different or substantially different lengths L2.

A wire 114 can include any suitable diameter d2 (see e.g., FIG. 2A) and/or other dimensions that can facilitate creating and/or generating an ESF. In various embodiments, the diameter d2 can be in the range of about 0.1 millimeters to about 100 millimeters.

In some embodiments, each wire 114 in a plurality of wires 114 includes the same or substantially the same diameter d2. In alternative embodiments, at least two wires 114 in a set of wires 114 include different or substantially different diameters d2. In further alternative embodiments, each wire 114 in a set of wires 114 includes different or substantially different diameters d2.

A wire 114 can possess, maintain, and/or hold any suitable amount of positive voltage that can facilitate creating and/or generating an ESF. In various embodiments, a wire 114 can possess, maintain, and/or hold a positive voltage in the range of about 100 volts to about 1 MV, among other voltages and/or ranges of voltages that are possible and contemplated herein. In some embodiments, a wire 112 can possess, maintain, and/or hold up to about 20 kV. In other embodiments, a wire 114 can possess, maintain, and/or hold up to about 50 kV. In additional or alternative embodiments, a wire 114 can possess, maintain, and/or hold up to about 100 kV. In further additional or alternative embodiments, a wire 114 can possess, maintain, and/or hold up to about 500 kV. In still further additional or alternative embodiments, a wire 114 can possess, maintain, and/or hold up to about 1 MV, among other voltages that are possible and contemplated herein.

The amount of positive voltage maintained, possessed, and/or held in a wire 114 depends on the length L2 of the wire 114. In some embodiments, the longer the length L2, the smaller the amount of positive voltage that the wire 114 maintains, possesses, and/or holds since there is a greater amount of time and/or distance to alter the path 304 of the potentially harmful particles (e.g., radiation) from a radiation source 75. In other words, because a smaller change in angular displacement per unit wire length is needed for a wire 114 with a longer length L2 to alter the path 25 of the radiation, a smaller amount of positive voltage can be utilized in the wire 114 to alter the path 25 of the radiation to the altered path 304 since there is more distance/time for the ESF to act on the radiation.

Conversely, the shorter the length L2, the greater the amount of positive voltage that the wire 114 can maintain, possess and/or hold. That is, greater amounts of positive voltage may be utilized in shorter lengths L2 since there is a smaller amount of time and/or distance to alter the path 304 of the potentially harmful particles (e.g., radiation) from a radiation source 75. In other words, because a larger change in angular displacement per unit wire length is needed for a wire 114 with a shorter length L2 to alter the path 25 of the radiation, a larger amount of positive voltage can be utilized in the wire 114 to alter the path 25 of the radiation to the altered path 304 since there is less distance/time for the ESF to act on the radiation.

In various embodiments, a wire 112A is separated from a wire 114 by a distance D1. The distance D1 may be any suitable distance that can facilitate creation and/or generation of an ESF by the ESF generator 100. In various embodiments, the distance D1 can be in the range of about 1 meter to about 100 meters.

In various embodiments, the distance D1 is at least half of the size (e.g., width and/or height) of the spacecraft being protected by the ESF generator 100. In some embodiments, the distance D1 is in the range of 0.5 times to 0.8 times the size (e.g., width and/or height) of the spacecraft being protected by the ESF generator 100. In other embodiments, the distance D1 is in the range of 0.5 times to 3 times the size (e.g., width and/or height) of the spacecraft being protected by the ESF generator 100.

Similarly, a wire 112B is separated from the wire 114 by a distance D2. The distance D2 may be any suitable distance that can facilitate creation and/or generation of an ESF by the ESF generator 100. In various embodiments, the distance D2 can be in the range of about 1 meters to about 100 meters.

In various embodiments, the distance D2 is at least half of the size (e.g., width and/or height) of the spacecraft being protected by the ESF generator 100. In some embodiments, the distance D2 is in the range of 0.5 times to 0.8 times the size (e.g., width and/or height) of the spacecraft being protected by the ESF generator 100. In other embodiments, the distance D2 is in the range of 0.5 times to 3 times the size (e.g., width and/or height) of the spacecraft being protected by the ESF generator 100. In still other embodiments, the total accumulated distance of the distance D1 and the distance D2 is equal to, greater than, or greater than within a predetermined tolerance of the size (e.g., width and/or height) of the spacecraft being protected by the ESF generator 100.

In some embodiments, the distances D1 and D2 are the same or substantially the same distance. In alternative embodiments, the distances D1 and D2 are different distances.

In various embodiments, the distance D1 and/or the distance D2 may be adjustable. The adjustability of D1 and/or D2 can be performed manually (e.g., by a user) and/or automatically by the ESF generator 100.

In some embodiments, the lengths L1 and L2 are the same or substantially the same length. In alternative embodiments, the lengths L1 and L2 are different lengths.

In various embodiments, the length L1 and/or the length L2 may be adjustable. The adjustability of length(s) L1 and/or L2 can be performed manually (e.g., by a user) and/or automatically by the ESF generator 100.

Diameters d1 and d2, in some embodiments, are the same or substantially the same diameters. In alternative embodiments, the at least one diameter d1 and diameter d2 are different diameters. In further alternative embodiments, each diameter d1 and d2 are different diameters.

In various embodiments, an ESF generator 100A and/or 100B (also simply referred individually, in various groups, or collectively as ESF generator(s) 100) can generate an electrostatic field proximate to a vehicle (e.g., a spacecraft) and/or between the vehicle and a radiation source (e.g., the sun) to protect the vehicle from the radiation source. The generated ESF can repel, deflect, and/or displace potentially harmful particles (e.g., high-energy particles, radiation, protons, etc.) so that the potentially harmful particles do not come into contact with the vehicle. That is, the ESF can shield and/or provide a shield for the vehicle against the potentially harmful particles.

In various embodiments, a generated ESF can shield a spacecraft from radiation on the range of about 1 MeV proton energies to about 250 MeV proton energies. In some embodiments, a generated/created ESF can repel, deflect, and/or displace up to about 100 MeV proton energies. In additional or alternative embodiments, a generated/created ESF can repel, deflect, and/or displace up to about 250 MeV proton energies. Further, an ESF generator 100 can generate and/or create an ESF including any suitable field strength and/or voltage gradient that is capable of repelling, deflecting, and/or displacing potentially harmful particles (e.g., high-energy particles, radiation, protons, etc.) away from a vehicle (e.g., a spacecraft 302).

Figure 2G:
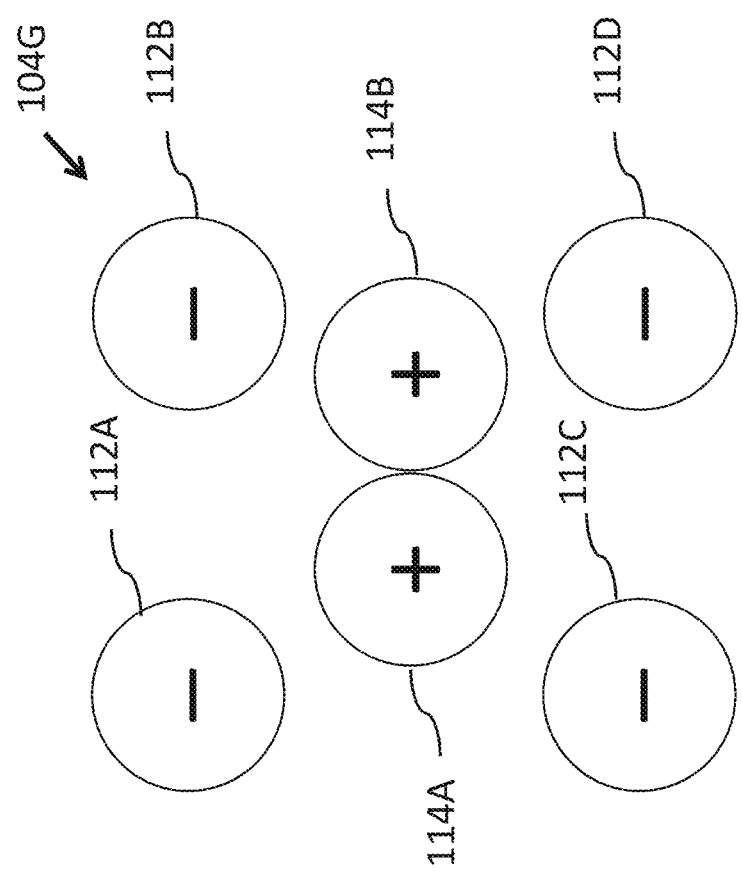
FIGS. 2A through 2P are schematic diagrams of a wire structure of an ESF generator in FIG. 1, according to various embodiments of the present disclosure.
Figure 2H:
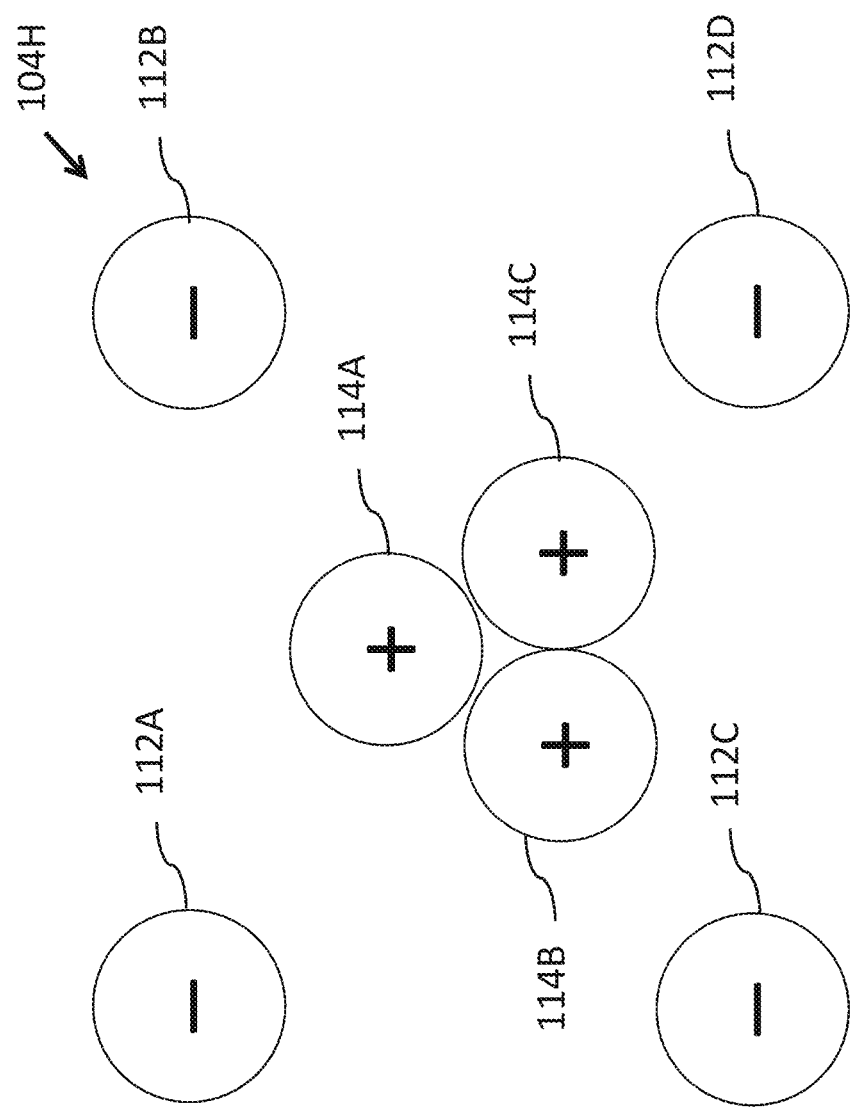
Figure 2J:
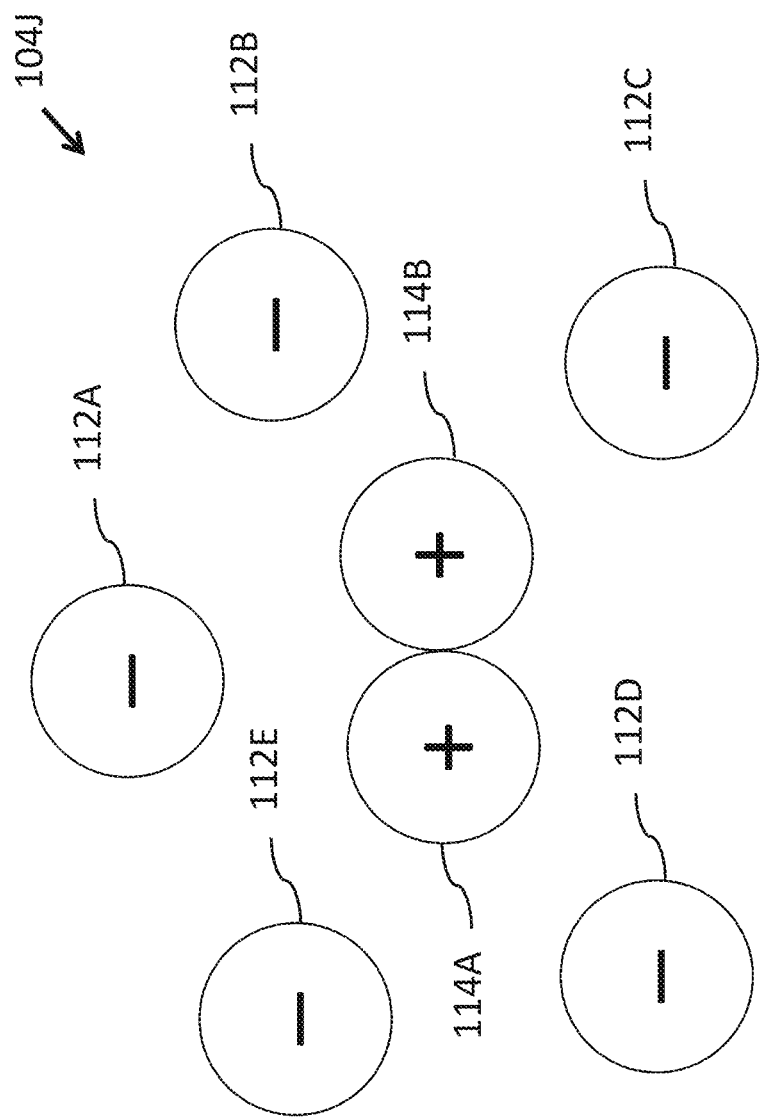
Figure 2K:
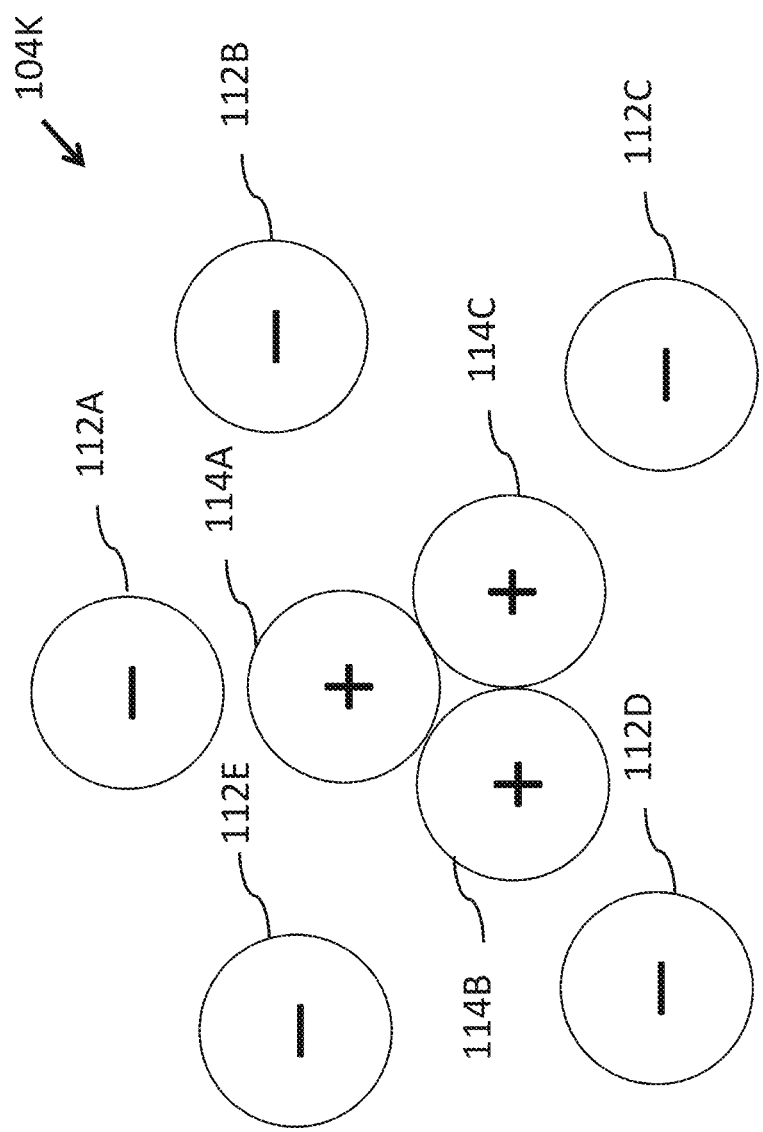
Figure 2L:
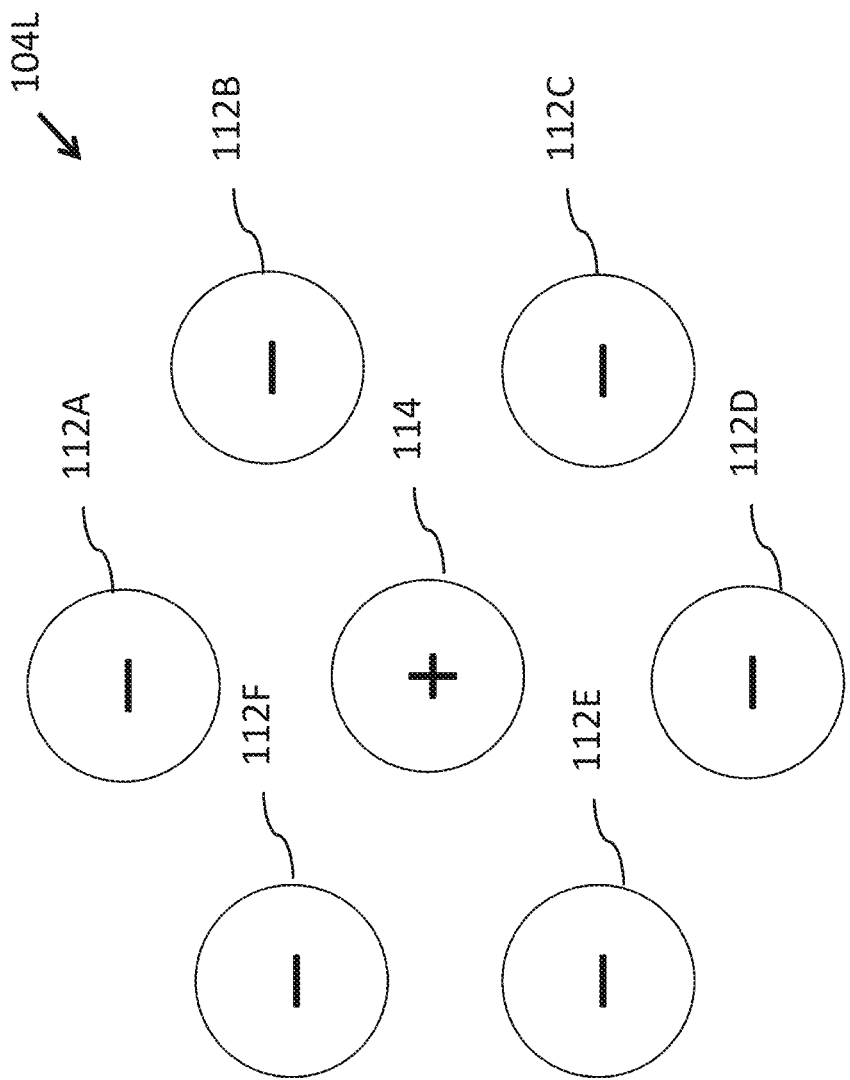
Figure 2N:
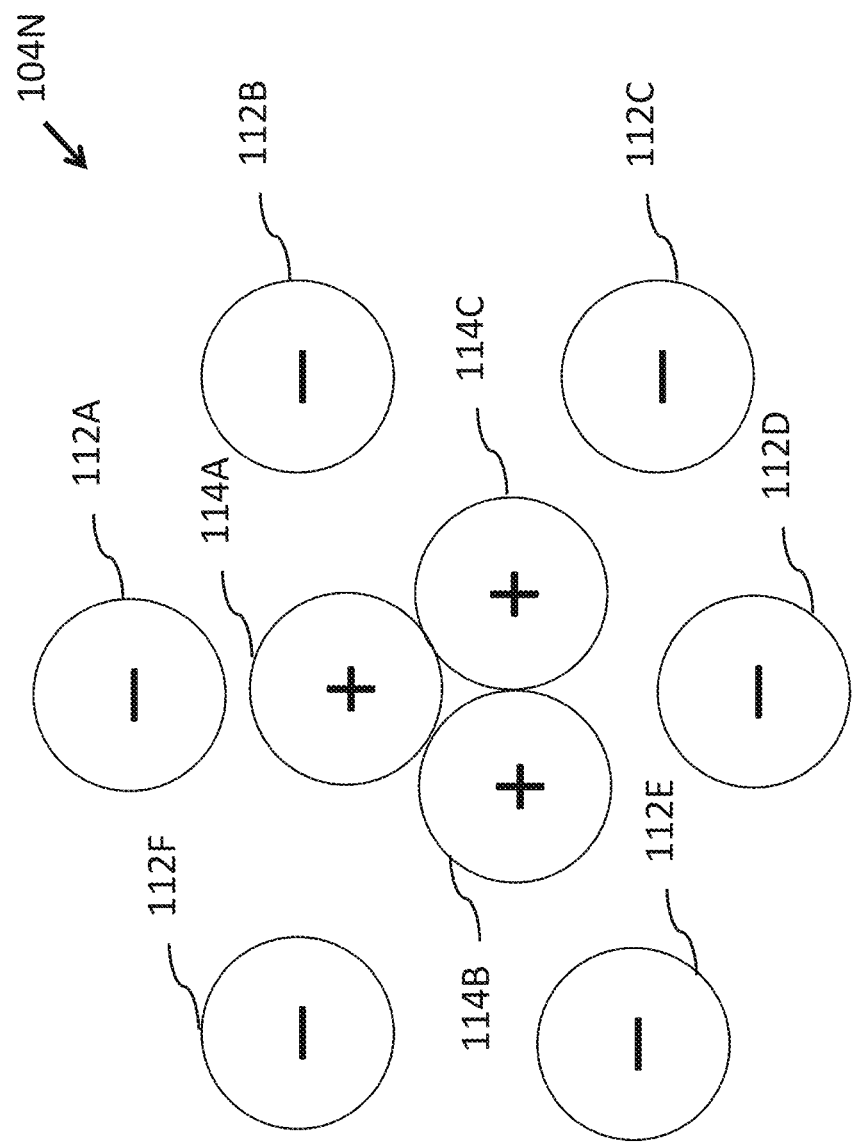

FIGS. 2A through 2N illustrate cross sectional views of various embodiments of an ESF generator 100. That is, the wire(s) 112 and the wire(s) 114 illustrated in FIGS. 2A through 2N extend out of and/or through their respective drawing sheets.

Referring to FIG. 2A, FIG. 2A is a diagram of one embodiment of a wire structure 104A that can be included within an ESF generator 100. At least in the illustrated embodiment, the wire structure 104A includes a plurality of wires 112 (e.g., a wire 112A (−) and a wire 112B (−)) and a set of wires 114 (e.g., a wire 114 (+)).

In some embodiments, the wires 112A and 112B are located on opposite sides of the wire 114. In the illustrated embodiment, the wires 112A and 112B are stacked in parallel with respect to the wire 114. Employing wires 112A and 112B stacked in parallel with respect to wire 114 can create a high voltage gradient in a concentrated area. Thus, a more uniform and dense ESF can be generated/created in a region between a vehicle and a radiation source (e.g., a spacecraft and the sun, respectively). A more uniform and dense ESF is more efficient at deflecting radiation, protons, and/or other potentially harmful particles away from the spacecraft than less uniform ESFs. Equation 1 can represent the proportionality of the force applied to a potentially harmful particle by an ESF:

$$F = qE. \quad (1)$$

where: F=the force on the charged particle; q is the charge of the particle; and E is the electric field. Further, equation 2 can represent an ESF as the gradient of the voltage:

$$E = -\nabla V. \quad (2)$$

where: E is the electric field; and ∇V is the gradient of the electric potential V.

With reference to FIG. 2B, FIG. 2B is a diagram of another embodiment of a wire structure 104B that can be included within an ESF generator 100. At least in the illustrated embodiment, the wire structure 104B includes a plurality of wires 112 (e.g., a wire 112A (−) and a wire 112B (−)) and a set of wires 114 (e.g., a wire 114A (+) and a wire 114B (+)).

In some embodiments, the wires 112A and 112B are located on opposite sides of the wires 114A and 114B. In the illustrated embodiment, the wires 112A and 112B are stacked in parallel with respect to the wires 114A and 114B. The inclusion of two wires 114 can provide redundancy to the wire structure 104B.

Referring to FIG. 2C, FIG. 2C is a diagram of an alternative embodiment of a wire structure 104C that can be included within an ESF generator 100. At least in the illustrated embodiment, the wire structure 104C includes a plurality of wires 112 (e.g., a wire 112A (−), a wire 112B (−), and a wire 112C (−)) and a set of wires 114 (e.g., a wire 114 (+)).

In some embodiments, the wires 112A, 112B, and 112C are arranged substantially around the wire 114 forming a triangle or triangular shape. In the illustrated embodiment, the wire 114 is located within the area defined by the triangle or triangular shape.

With reference to FIG. 2D, FIG. 2D is a diagram of another embodiment of a wire structure 104D that can be included within an ESF generator 100. At least in the illustrated embodiment, the wire structure 104D includes a plurality of wires 112 (e.g., a wire 112A (−), a wire 112B (−), and a wire 112C (−)) and a set of wires 114 (e.g., a wire 114A (+) and a wire 114B (+)).

In some embodiments, the wires 112A, 112B, and 112C are arranged substantially around the wires 114A and 114B forming a triangle or triangular shape. In the illustrated embodiment, the wires 114A and 114B are located within the area defined by the triangle or triangular shape. The inclusion of two wires 114 can provide redundancy to the wire structure 104D.

Referring to FIG. 2E, FIG. 2E is a diagram of yet another embodiment of a wire structure 104E that can be included within an ESF generator 100. At least in the illustrated embodiment, the wire structure 104E includes a plurality of wires 112 (e.g., a wire 112A (−), a wire 112B (−), and a wire 112C (−)) and a set of wires 114 (e.g., a wire 114A (+), a wire 114B (+), and a wire 114C (+)).

In some embodiments, the wires 112A, 112B, and 112C are arranged substantially around the wires 114A, 114B, and 114C forming a triangle or triangular shape. In the illustrated embodiment, the wires 114A, 114B, and 114C are located within the area defined by the triangle or triangular shape. The inclusion of three wires 114 can provide redundancy to the wire structure 104E.

With reference to FIG. 2F, FIG. 2F is a diagram of an alternative embodiment of a wire structure 104F that can be included within an ESF generator 100. At least in the illustrated embodiment, the wire structure 104F includes a plurality of wires 112 (e.g., a wire 112A (−), a wire 112B (−), a wire 112C (−), and a wire 112D (−)) and a set of wires 114 (e.g., a wire 114 (+)).

In some embodiments, the wires 112A, 112B, 112C, and 112D are arranged substantially around the wire 114 forming a quadrilateral shape. In the illustrated embodiment, the wires 112A, 112B, 112C, and 112D are arranged substantially around the wire 114 forming a square. Other quadrilateral shapes can include, but are not limited to, a rectangle, a rhombus, a trapezoid, a parallelogram, and a kite, etc., among other four-sided polygons that are possible and contemplated herein. As illustrated, the wire 114 is located within the area defined by the quadrilateral shape.

Referring to FIG. 2G, FIG. 2G is a diagram of another alternative embodiment of a wire structure 104G that can be included within an ESF generator 100. At least in the illustrated embodiment, the wire structure 104G includes a plurality of wires 112 (e.g., a wire 112A (−), a wire 112B (−), a wire 112C (−), and a wire 112D (−)) and a set of wires 114 (e.g., a wire 114A (+) and a wire 114B (+)).

In some embodiments, the wires 112A, 112B, 112C, and 112D are arranged substantially around the wires 114A and 114B forming a quadrilateral shape. In the illustrated embodiment, the wires 112A, 112B, 112C, and 112D are arranged substantially around the wires 114A and 114B forming a square. Other quadrilateral shapes can include, but are not limited to, a rectangle, a rhombus, a trapezoid, a parallelogram, and a kite, etc., among other four-sided polygons that are possible and contemplated herein. As illustrated, the wires 114A and 114B are located within the area defined by the quadrilateral shape. The inclusion of two wires 114 can provide redundancy to the wire structure 104G.

With reference to FIG. 2H, FIG. 2H is a diagram of yet another embodiment of a wire structure 104H that can be included within an ESF generator 100. At least in the illustrated embodiment, the wire structure 104H includes a plurality of wires 112 (e.g., a wire 112A (−), a wire 112B (−), a wire 112C (−), and a wire 112D (−)) and a set of wires 114 (e.g., a wire 114A (+), a wire 114B (+), and a wire 114C (+)).

In some embodiments, the wires 112A, 112B, 112C, and 112D are arranged substantially around the wires 114A, 114B, and 114C forming a quadrilateral shape. In the illustrated embodiment, the wires 112A, 112B, 112C, and 112D are arranged substantially around the wires 114A, 114B, and 114C forming a square. Other quadrilateral shapes can include, but are not limited to, a rectangle, a rhombus, a trapezoid, a parallelogram, and a kite, etc., among other four-sided polygons that are possible and contemplated herein. As illustrated, the wires 114A, 114B, and 114C are located within the area defined by the quadrilateral shape. The inclusion of three wires 114 can provide redundancy to the wire structure 104H.

With reference to FIG. 2I, FIG. 2I is a diagram of an alternative embodiment of a wire structure 104I that can be included within an ESF generator 100. At least in the illustrated embodiment, the wire structure 104I includes a plurality of wires 112 (e.g., a wire 112A (−), a wire 112B (−), a wire 112C (−), a wire 112D (−), and a wire 112E (−)) and a set of wires 114 (e.g., a wire 114 (+)).

In some embodiments, the wires 112A, 112B, 112C, 112D, and 112E are arranged substantially around the wire 114 forming a five-sided shape. In the illustrated embodiment, the wires 112A, 112B, 112C, 112D, and 112E are arranged substantially around the wire 114 forming a pentagon. Other embodiments can include regular or irregular five-sided shapes. As illustrated, the wire 114 is located within the area defined by the five-sided shape (e.g., pentagon).

Referring to FIG. 2J, FIG. 2J is a diagram of another alternative embodiment of a wire structure 104J that can be included within an ESF generator 100. At least in the illustrated embodiment, the wire structure 104J includes a plurality of wires 112 (e.g., a wire 112A (−), a wire 112B (−), a wire 112C (−), a wire 112D (−), and a wire 112E (−)) and a set of wires 114 (e.g., a wire 114A (+) and a wire 114B (+)).

In some embodiments, the wires 112A, 112B, 112C, 112D, and 112E are arranged substantially around the wires 114A and 114B forming a five-sided shape. In the illustrated embodiment, the wires 112A, 112B, 112C, 112D, and 112E are arranged substantially around the wires 114A and 114B forming a pentagon. Other embodiments can include regular or irregular five-sided shapes. As illustrated, the wires 114A and 114B are located within the area defined by the five-sided shape (e.g., pentagon). The inclusion of two wires 114 can provide redundancy to the wire structure 104J.

With reference to FIG. 2K, FIG. 2K is a diagram of yet another embodiment of a wire structure 104K that can be included within an ESF generator 100. At least in the illustrated embodiment, the wire structure 104J includes a plurality of wires 112 (e.g., a wire 112A (−), a wire 112B (−), a wire 112C (−), a wire 112D (−), and a wire 112E (−)) and a set of wires 114 (e.g., a wire 114A (+), a wire 114B (+), and a wire 114C (+)).

In some embodiments, the wires 112A, 112B, 112C, 112D, and 112E are arranged substantially around the wires 114A, 114B and 114C forming a five-sided shape. In the illustrated embodiment, the wires 112A, 112B, 112C, 112D, and 112E are arranged substantially around the wires 114A, 114B and 114C forming a pentagon. Other embodiments can include regular or irregular five-sided shapes. As illustrated, the wires 114A, 114B and 114C are located within the area defined by the five-sided shape (e.g., pentagon). The inclusion of three wires 114 can provide redundancy to the wire structure 104K.

With reference to FIG. 2L, FIG. 2L is a diagram of an alternative embodiment of a wire structure 104L that can be included within an ESF generator 100. At least in the illustrated embodiment, the wire structure 104L includes a plurality of wires 112 (e.g., a wire 112A (−), a wire 112B (−), a wire 112C (−), a wire 112D (−), a wire 112E (−), and a wire 112F (−)) and a set of wires 114 (e.g., a wire 114 (+)).

In some embodiments, the wires 112A, 112B, 112C, 112D, 112E, and 112F are arranged substantially around the wire 114 forming a six-sided shape. In the illustrated embodiment, the wires 112A, 112B, 112C, 112D, 112E, and 112F are arranged substantially around the wire 114 forming a hexagon. Other embodiments can include regular or irregular six-sided shapes. As illustrated, the wire 114 is located within the area defined by the six-sided shape (e.g., hexagon).

Referring to FIG. 2M, FIG. 2M is a diagram of another alternative embodiment of a wire structure 104M that can be included within an ESF generator 100. At least in the illustrated embodiment, At least in the illustrated embodiment, the wire structure 104104M includes a plurality of wires 112 (e.g., a wire 112A (−), a wire 112B (−), a wire 112C (−), a wire 112D (−), a wire 112E (−), and a wire 112F (−)) and a set of wires 114 (e.g., a wire 114A (+) and a wire 114B (+)).

In some embodiments, the wires 112A, 112B, 112C, 112D, 112E, and 112F are arranged substantially around the wires 114A and 114B forming a six-sided shape. In the illustrated embodiment, the wires 112A, 112B, 112C, 112D, 112E, and 112F are arranged substantially around the wires 114A and 114B forming a hexagon. Other embodiments can include regular or irregular six-sided shapes. As illustrated, the wires 114A and 114B are located within the area defined by the six-sided shape (e.g., hexagon). The inclusion of two wires 114 can provide redundancy to the wire structure 104M.

With reference to FIG. 2N, FIG. 2N is a diagram of yet another embodiment of a wire structure 104N that can be included within an ESF generator 100. At least in the illustrated embodiment, the wire structure 104N includes a plurality of wires 112 (e.g., a wire 112A (−), a wire 112B (−), a wire 112C (−), a wire 112D (−), a wire 112E (−), and a wire 112F (−)) and a set of wires 114 (e.g., a wire 114A (+), a wire 114B (+), and a wire 114C (+)).

In some embodiments, the wires 112A, 112B, 112C, 112D, 112E, and 112F are arranged substantially around the wires 114A, 114B, and 114C forming a six-sided shape. In the illustrated embodiment, the wires 112A, 112B, 112C, 112D, 112E, and 112F are arranged substantially around the wires 114A, 114B, and 114C forming a hexagon. Other embodiments can include regular or irregular six-sided shapes. As illustrated, the wires 114A, 114B, and 114C are located within the area defined by the six-sided shape (e.g., hexagon). The inclusion of three wires 114 can provide redundancy to the wire structure 104N.

Figure 2O:
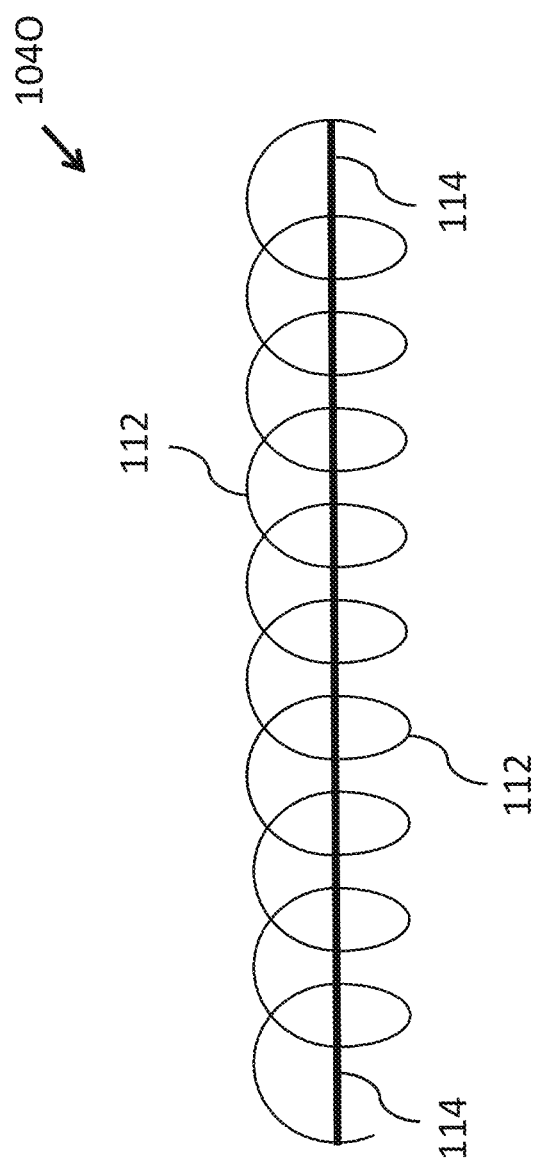

FIG. 2O is a diagram of another embodiment of a wire structure 104O that can be included within an ESF generator 100. At least in the illustrated embodiment, the wire structure 104O includes a set of wires 112 (e.g., a wire 112(−)) and a set of wires 114 (e.g., a wire 114 (+)).

In some embodiments, the wire 114 may be straight or substantially straight. Further, the wire 112 can be coiled and/or looped around the straight wire 114 (e.g., a negative wire coiled/looped around a straight positive wire). The loop(s) may include any suitable size and/or diameter that can generate/create an ESF when power is supplied to the wire 112 and the wire 114.

Figure 2P:
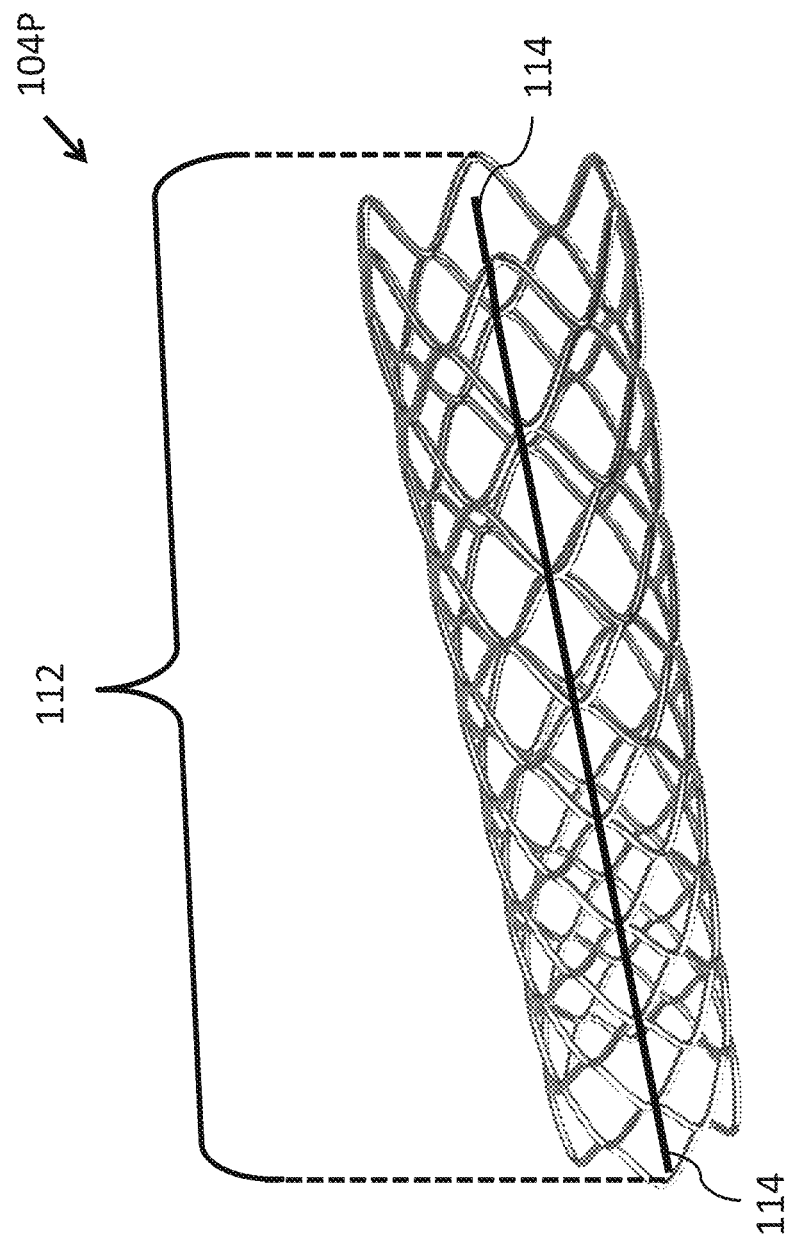

FIG. 2P is a diagram of another embodiment of a wire structure 104P that can be included within an ESF generator 100. At least in the illustrated embodiment, the wire structure 104P includes a set of wires 112 (e.g., a wire 112(−)) and a set of wires 114 (e.g., a wire 114 (+)).

In some embodiments, the wire 114 may be straight or substantially straight. Further, the wire 112 can form a mesh and/or matrix structure around the straight wire 114 (e.g., a mesh/matrix negative wire around a straight positive wire). The mesh/matrix configuration can include any suitable shape and/or dimensions that can generate/create an ESF when power is supplied to the wire 112 and the wire 114. The mesh/matrix configuration of the wire 112 may include a conductive film that can be either solid or contain open sections (e.g., a perforated film).

At least in the illustrated embodiment, the mesh/matrix structure of the wire 112 includes a generally tubular shape, among other shapes that are possible and contemplated herein. In additional or alternative embodiments, the mesh/matrix of the wire 112 can include any suitable sized, area, gap, and/or void between the various segments/sections of the wire 112. In some embodiments, a distance between the various segments/sections of the wire 112 can be up to about one meter, among other distances that are possible and contemplated herein. In further additional or alternative embodiments, the mesh/matrix configuration can be a coarse mesh/matrix configuration.

The various embodiments of wire structures 104A through 104P have been illustrated in two dimensions (e.g., on an X-axis and a Y-axis) in FIGS. 2A through 2N, respectively. It is noted, however, that one or more of wires 112 and wire(s) 114 illustrated in one or more of FIGS. 2A through 2N may extend vertically out (e.g., on a Z-axis) of a respective figure (see e.g., FIG. 2A).

With reference again to FIG. 1A (and FIG. 1B), a processor 106 may include any suitable processing hardware and/or software that can perform computer processes, functions, and/or algorithms. In various embodiments, a processor 106 can be configured to perform a set of operations and/or algorithms for generating an ESF to protect a vehicle (e.g., spacecraft) from radiation released from a radiation source. At least in the illustrated embodiment, the processor 106 includes, among other elements, a tracking module 108 and a positioning module 110.

A tracking module 108 may include any suitable hardware and/or software that can track the position and/or location of a spacecraft relative to a radiation source (see e.g., spacecraft 302 and radiation source 75 in FIGS. 3A through 3C and FIGS. 4A through 4C, etc.). In various embodiments, a tracking module 108 can track the relative positions/locations as the spacecraft travels and can further determine a position and/or location between the spacecraft and the radiation source at which to position an ESF generator 100A and/or 100B to facilitate protecting the spacecraft from radiation (e.g., the non-altered path 25 of the radiation in FIGS. 3A through 3C and FIGS. 4A through 4C, etc.) generated by the radiation source 75.

A positioning module 110 may include any suitable hardware and/or software that can position and/or dynamically re-position a set of ESF generators (e.g., ESF generator(s) 100A and/or ESF generator(s) 100B, also simply referred individually, in various groups, or collectively as ESF generator(s) 100). In various embodiments, a positioning module 110 can position/re-position one or more ESF generators 100 to a particular location/position between a spacecraft and a radiation source in response to receiving a set of commands and/or instructions from a tracking module 108. That is, in response to receiving the set of commands and/or instructions from the tracking module 108, a positioning module 110 can position/re-position one or more ESF generators 100 to the particular location/position so that the ESF generator(s) 100 can generate/create an ESF between the spacecraft 302 and the radiation source 75 to provide angular displacement to and/or alter the path 25 of radiation generated by the radiation source 75 to the altered path 304 in an effort to protect the spacecraft 302 from the radiation.

In some embodiments, a positioning module 110 can position/re-position the ESF generator(s) 100 that is/are tethered to the spacecraft (see e.g., FIGS. 3A thorough 3C) using, for example, a motor and/or other suitable mechanism that can provide mobility to the ESF generator(s) 100. In additional or alternative embodiments, a positioning module 110 can position/re-position the ESF generator(s) 100 via a propulsion system (see e.g., propulsion system 402 in FIGS. 4A through 4C). That is, the positioning module 110 can transmit a set of commands and/or instructions to the propulsion system to position and/or re-position the ESF generator(s) 100 in accordance with the position provided by the tracking module 108.

Figure 3A:
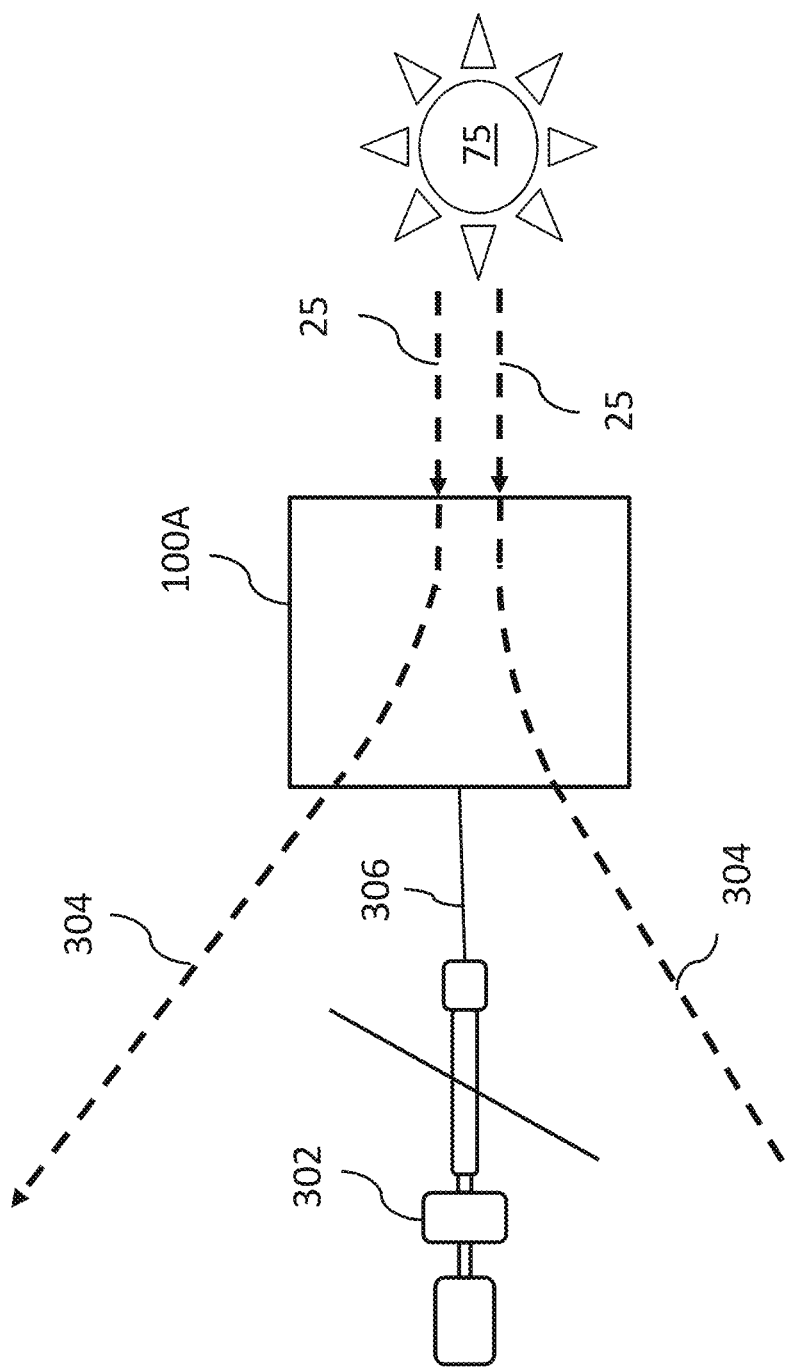
FIGS. 3A through 3C are schematic diagrams of a spacecraft including an ESF generator of FIG. 1 to protect the spacecraft from radiation released from a radiation source, according to one or more examples of the present disclosure.
Figure 3B:
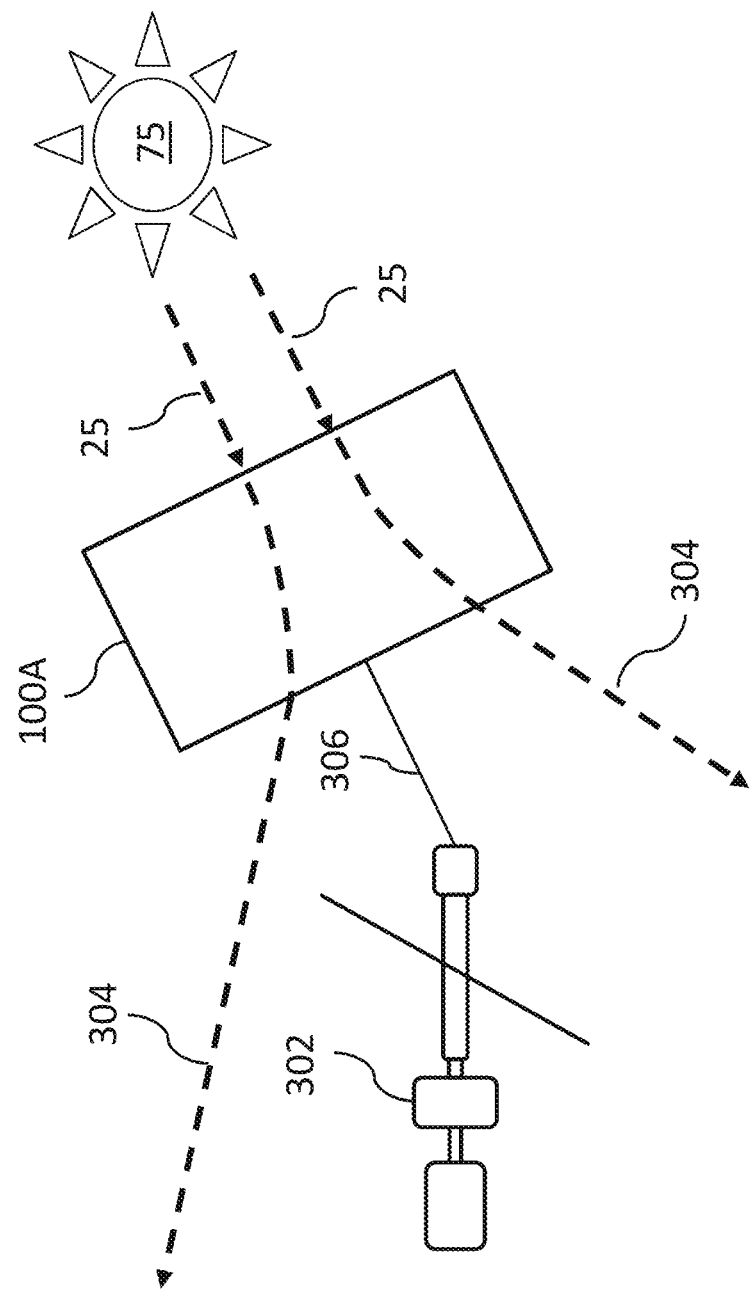
Figure 3C:
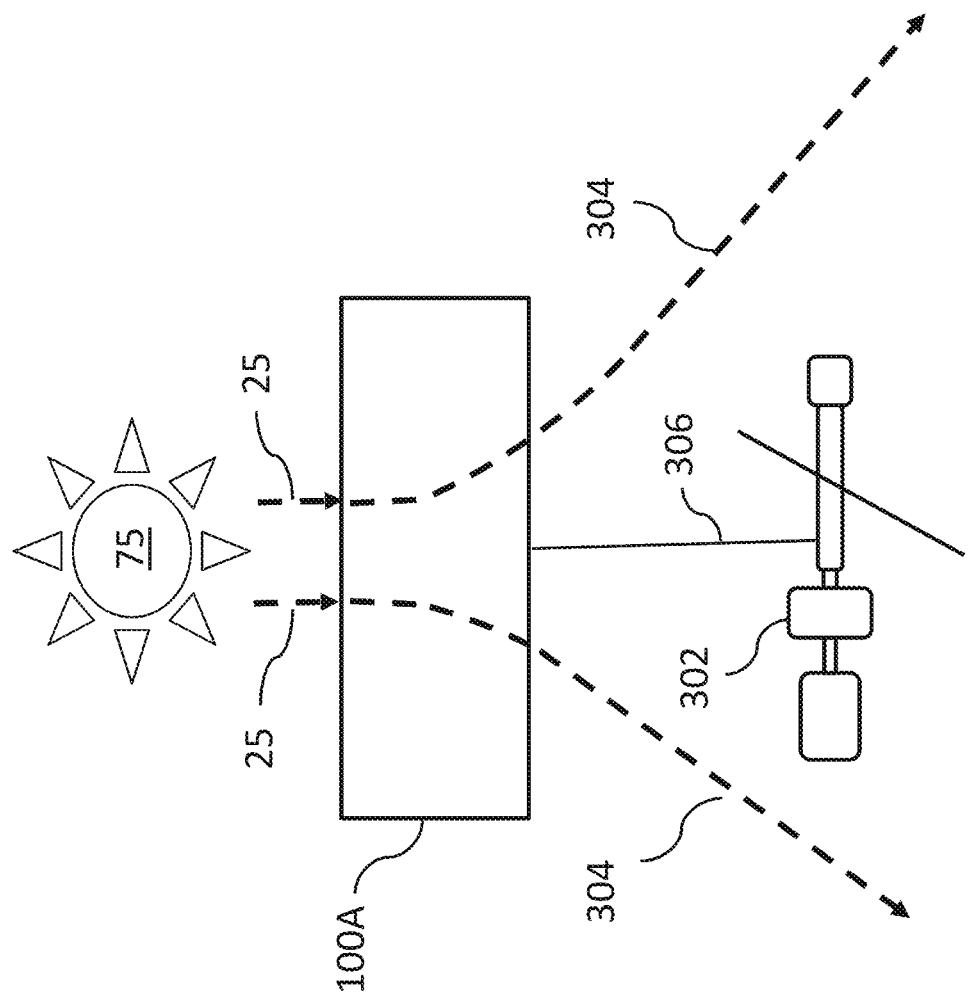

Referring to FIGS. 3A through 3C, FIGS. 3A through 3C illustrate a spacecraft 302 positioning one embodiment of an ESF generator 100A to protect itself from radiation generated by a radiation source 75 (e.g., the sun). As illustrated in FIGS. 3A through 3C, the ESF generator 100A is tethered to the spacecraft via a tethering mechanism 306 and positioned between the spacecraft 302 and the radiation source 75 so that an ESF can be generated between the spacecraft 302 and the radiation source 75 to alter the path 25 of the radiation (e.g., deflect the path 25 of the radiation to the altered path 304, which is away from the spacecraft 302) while the spacecraft 302 travels. In various embodiments, the ESF generator 100A may include one or more components (e.g., a tracking module 108 and/or positioning module 110 (see FIG. 1A) to track and/or maintain an ESF between the spacecraft 302 and the radiation source 75.

As illustrated in FIGS. 3A through 3C, during operation of the ESF generator 100A, the radiation approaches an ESF generated by the ESF generator 100A on a straight or relatively straight path 25. Upon coming into contact with the ESF, the path 25 of the radiation can immediately become deflected to the altered path 304, which is shown within the ESF generator 100A. The radiation continues to be deflected within the ESF generator 100A until it exits the ESF generator 100A, which is represented by the curvature of altered path 304 within the ESF generator 304. Upon exiting the ESF generator 100A, the particles of radiation travel on a trajectory that is straight or relatively straight with respect to the angle at which the particles exit the ESF generator 100A, which is represented by the straight altered path 304 outside of the ESF generator 100A.

A tethering mechanism 306 can include any suitable structure and/or configuration that can couple and/or connect an ESF generator 100 to the spacecraft 302. In some embodiments, a tethering mechanism 306 can include, but is not limited to, a wire, a truss structure, a pole, a bar, a post, a mast, a rod, and/or a shaft, etc. among other suitable structures that can tether an ESF generator 100 to a spacecraft 302 that are possible and contemplated herein. In additional or alternative embodiments, a tethering mechanism 306 can include an adjustable length so that an ESF generator 100 and/or an ESF can be located and/or generated different distances from the spacecraft. 302.

In FIG. 3A, the spacecraft 302 is traveling directly toward the radiation source 75. Here, the ESF generator 100A is positioned directly or substantially directly in front of the spacecraft 302 so that an ESF is generated directly or substantially directly between the spacecraft 302 and the radiation source 75 to repel, deflect, and/or displace the radiation from the path 25 to the altered path 304 so that potentially harmful particles (e.g., high-energy particles, protons, etc.) do not contact and/or collide with the spacecraft 302. When the spacecraft 302 is traveling directly away from the radiation source 75, the ESF generator 100A is positioned directly or substantially directly behind the spacecraft 302 so that an ESF is generated directly or substantially directly between the spacecraft 302 and the radiation source 75 to alter the path 25 of the radiation. Referring to FIG. 3B, as the spacecraft 302 travels, the radiation source 75 (and radiation 25) can become oriented at a different angle with respect to the spacecraft 302. As the spacecraft 302 travels, the ESF generator 100A can be re-positioned and/or shadow the spacecraft 302 so that the ESF remains directly or substantially directly between the spacecraft 302 and the radiation source 75. In this manner, the ESF can continue to be positioned directly or substantially directly between the spacecraft 302 and the radiation source 75 to continue to alter the path 304 of the radiation 25 (e.g., repel, deflect, and/or displace the radiation 25 released from the radiation source 75) as the spacecraft 302 travels.

In FIG. 3C, the spacecraft 302 has continued to travel and the ESF generator 100 is continuously, substantially continuously, or periodically re-positioned between the spacecraft 302 and the radiation source. By re-positioning the ESF generator 100A, the ESF remains directly or substantially directly between the spacecraft 302 and the radiation source 75. In this manner, altering the path 304 of the radiation 25 can continue and the spacecraft 302 can be protected from the radiation 25 as the spacecraft 302 travels and/or as the orientation of the radiation source 75 with respect to the spacecraft 302 changes.

In various embodiments, the ESF generator 100A can be manually repositioned as the spacecraft 302 travels. In additional or alternative embodiments, the ESF generator 100A can automatically reposition itself as the spacecraft 302 travels.

FIGS. 4A through 4C illustrate a spacecraft 302 similar to the spacecraft 302 discussed with respect to FIGS. 3A through 3C. In the embodiments of FIGS. 4A through 4C, an ESF generator 100B is not tethered to the spacecraft 302. That is, the ESF generator 100B can be a separate, stand-alone, and/or free-standing apparatus/system with respect to the spacecraft 302.

As illustrated in FIGS. 4A through 4C, during operation of the ESF generator 100A, the radiation approaches an ESF generated by the ESF generator 100B on a straight or relatively straight path 25. Upon coming into contact with the ESF, the path 25 of the radiation can immediately become deflected to the altered path 304, which is shown within the ESF generator 100B. The radiation continues to be deflected within the ESF generator 100B until it exits the ESF generator 100B, which is represented by the curvature of altered path 304 within the ESF generator 304. Upon exiting the ESF generator 100B, the particles of radiation travel on a trajectory that is straight or relatively straight with respect to the angle at which the particles exit the ESF generator 100B, which is represented by the straight altered path 304 outside of the ESF generator 100B.

In one embodiment, an ESF generator 100B can include a propulsion system 402 and/or other components (e.g., a tracking module 602 and/or positioning module 604 that can reposition the ESF 100B (and the ESF) between the spacecraft 302 and the radiation source 75 as the spacecraft travels. A propulsion system 402 may include any suitable hardware and/or software that can facilitate positioning an ESF generator 100B. In some embodiments, a propulsion system 402 includes a set of thrusters, motors, and/or engines. In various embodiments, the ESF generator 100B can be manually repositioned as the spacecraft 302 travels. In additional or alternative embodiments, the ESF generator 100B can automatically reposition itself, via the propulsion system 402, to synchronize its position relative to the spacecraft 302 and the radiation source 75 as the spacecraft 302 travels.

Figure 5:
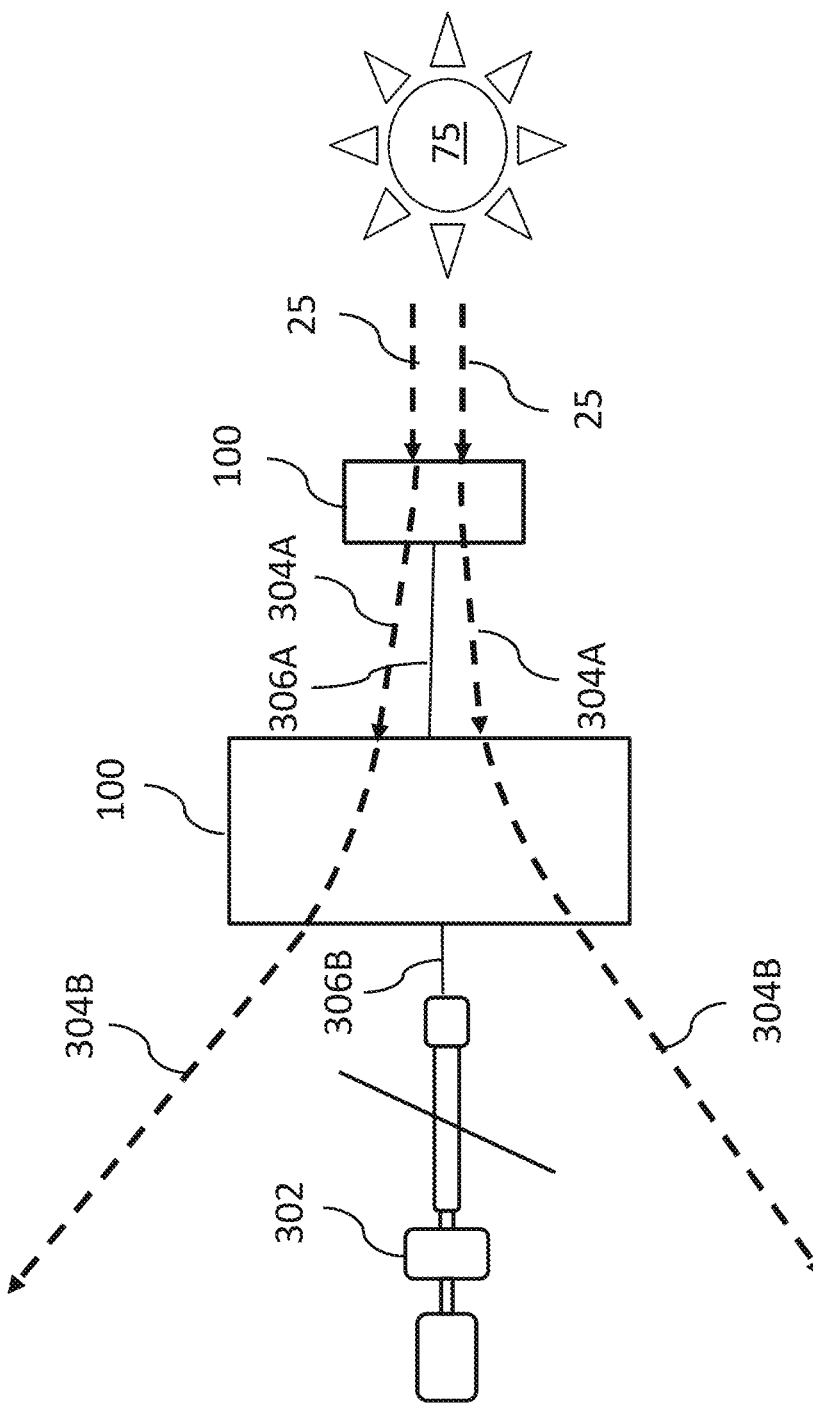
FIG. 5 is a schematic diagram of a spacecraft utilizing multiple ESF generators to protect the spacecraft from radiation released from a radiation source, according to one or more examples of the present disclosure.

FIG. 5 illustrates a spacecraft 302 utilizing multiple ESF generators 100 to protect the spacecraft 302 from the radiation 25 generated by a radiation source 75. At least in the illustrated embodiment, two ESF generators 100 are coupled in series via tethering mechanisms 306A and 306B and are located between the spacecraft and the radiation source 75, among other quantities that are possible and contemplated herein.

The ESF generators 100 may include any of the ESF generators discussed above with reference to FIGS. 2A through 2O. In some embodiments, the ESF generators 100 may include dimensions and/or other parameters that are smaller than embodiments that utilize a single ESF generator 100. Further, the ESF generators 100 can be utilized to deflect the path 25 of the radiation in a cascade of altered paths 304A and 304B.

In an alternative embodiment, the ESF generators 100 can include a propulsion system (see e.g., propulsion system 402 in FIGS. 4A through 4C) to maintain the position of the ESF generators 100 and/or to re-position the ESF generators 100. In additional or alternative embodiments, one or more ESF generators 100 includes a tethering mechanism 306 and one or more ESF generators 100 includes a propulsion system 402 to maintain the position of the ESF generators 100 and/or to re-position the ESF generators 100.

Figure 6A:
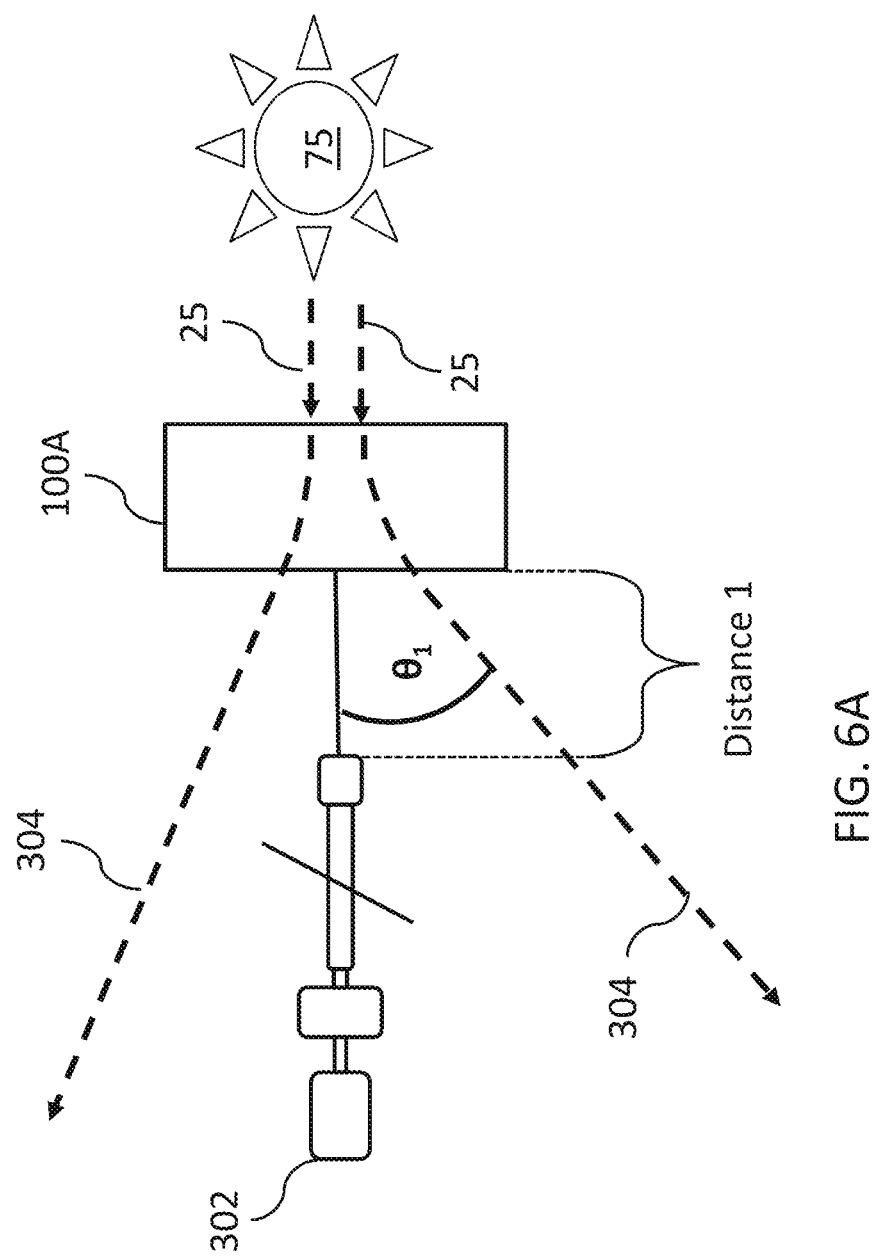
FIGS. 6A and 6B are diagrams illustrating examples of an ESF generator of FIG. 1 at various positions relative to the spacecraft that include different distances from the spacecraft, according to various examples of the present disclosure.
Figure 6B:
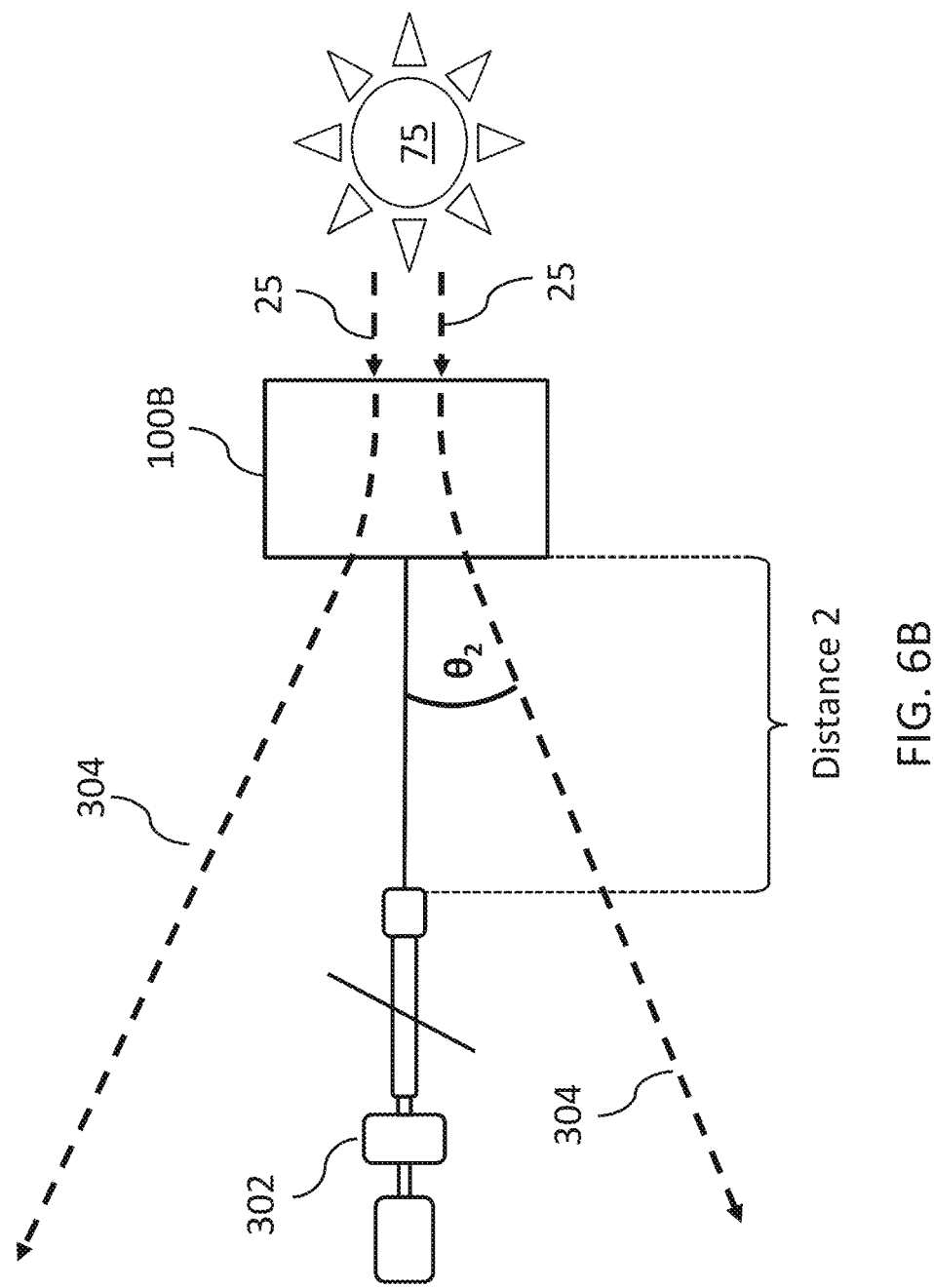

FIGS. 6A and 6B illustrate ESF generators 100A and 100B located at different distances away from the spacecraft 302. As illustrated, ESF generator 100A is positioned closer to the spacecraft 302 than the ESF generator 100B (e.g., distance 1 is smaller than distance 2).

The ESF generator 100A deflects incoming radiation along path 25 at an angle $\theta_1$ and ESF generator 100B deflects the radiation at an angle $\theta_2$. Because the distance 1 is smaller than the distance 2, angle $\theta_1$ needs to be larger than angle $\theta_2$ so that the radiation is deflected far enough to avoid contacting the spacecraft 302. That is, the closer an ESF generator 100 is positioned to a spacecraft 302, the greater the amount of deflection needed to deflect radiation so that the radiation does not contact the spacecraft 302.

In various embodiments, an ESF generator 100 can be positioned in the range of about 1 meter to about 100 kilometers from the spacecraft 302, among other distances that are closer than 1 meter and farther than 100 kilometers that are possible and contemplated herein. Since tethering an ESF generator 100A to a spacecraft 302 can add weight to the spacecraft 302 and/or introduce other logistical issues, a maximum distance for distance 1 may be less than a maximum distance for distance 2.

To achieve greater amounts of deflection, greater amounts of power can be provided to an ESF generator 100. As such, the amount of power provided to the ESF generator 100B may be less than the amount of power provided to the ESF generator 100A to deflect the radiation to altered path 304. Conversely, the amount of power provided to the ESF generator 100A may be greater than the amount of power provided to the ESF generator 100B.

Figure 7A:
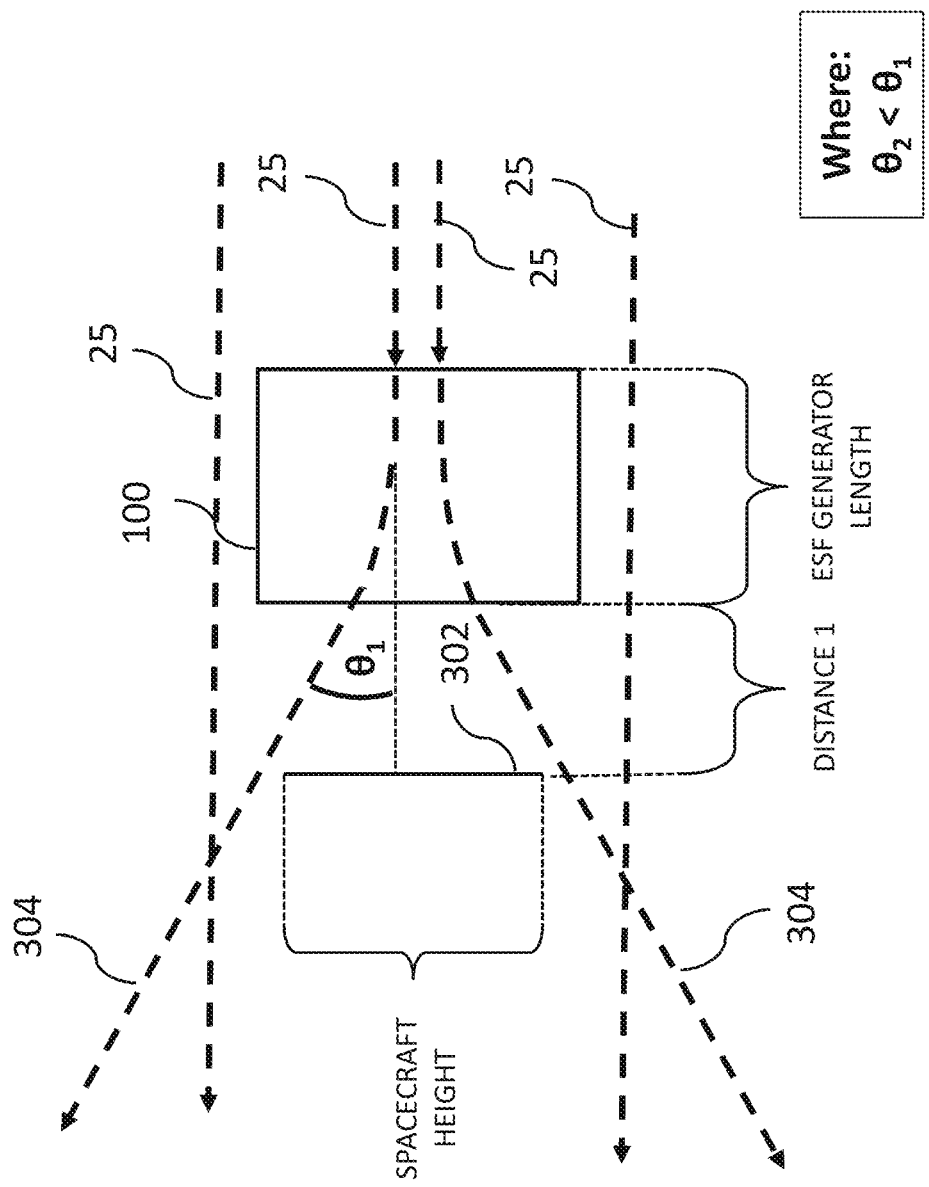
FIGS. 7A and 7B are diagrams illustrating an ESF generated by an ESF generator of FIG. 1 at different distances and being supplied with different amounts of power, according to various embodiments of the present disclosure.
Figure 7B:
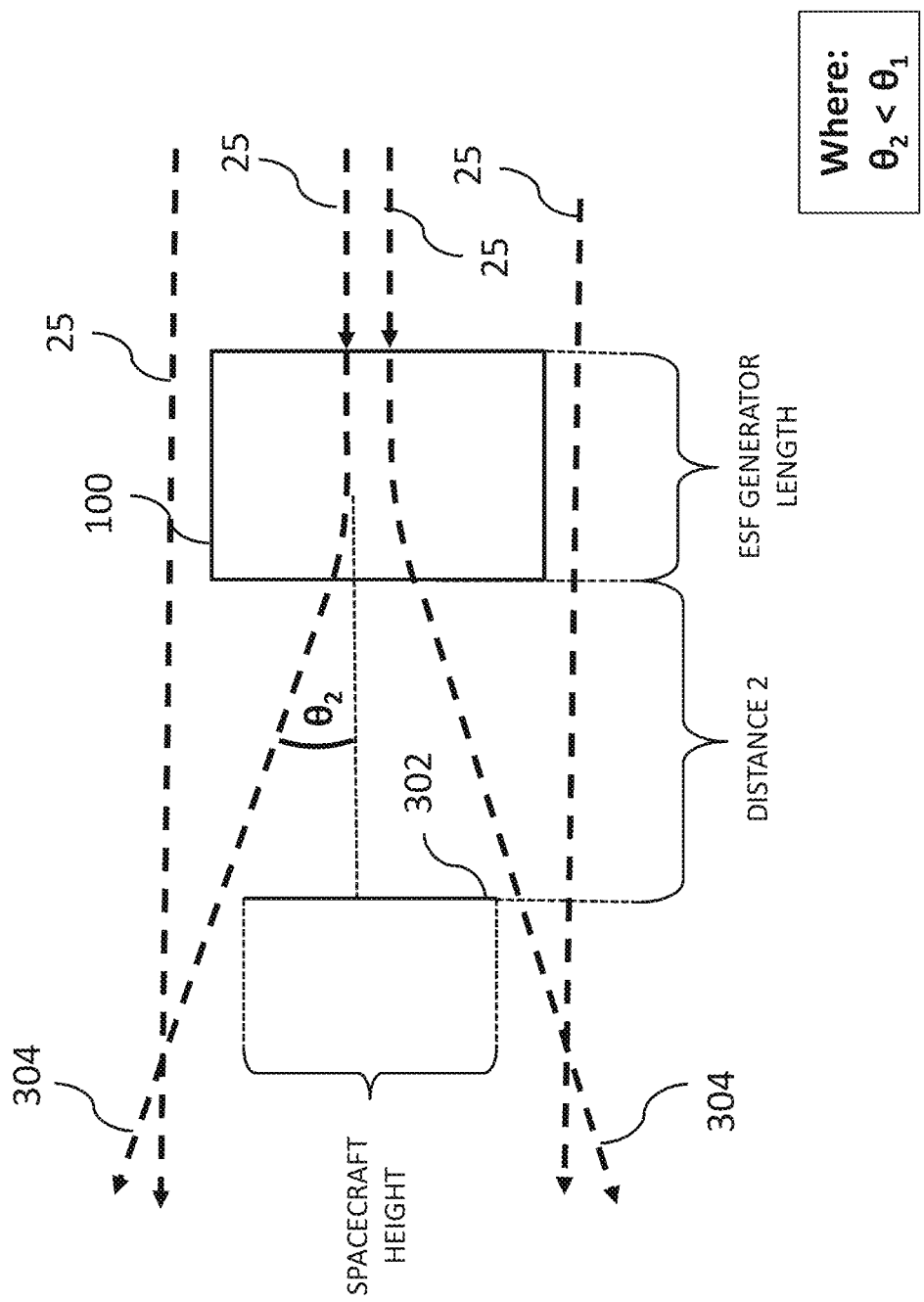

Referring to FIGS. 7A and 7B, FIGS. 7A and 7B illustrate the distance to power ratio for two non-limiting examples of distances 1 and 2, which are constant distances away from the spacecraft 302 and include the same, constant ESF generator lengths. Here, because a larger change in angular displacement per unit wire length to alter the path 25 of the radiation to the altered path 304 is needed for an ESF generator 100 positioned a relative smaller distance (e.g., distance 1) away from a spacecraft 302 to protect the spacecraft 302 from the radiation, a greater amount of negative voltage in the wire(s) 112 and positive voltage in the wire(s) 114 can be utilized to alter the path 25 of the radiation. Similarly, because a smaller change in the path 25 is needed for an ESF generator 100 positioned a relatively larger distance (e.g., distance 2) away from a spacecraft 302 to protect the spacecraft 302 from the radiation, a smaller amount of negative voltage in the wire(s) 112 and positive voltage in the wire(s) 114 can be utilized to alter the path 25 of the radiation to the altered path 304.

In the examples of FIGS. 7A and 7B, distance 1 is 10 meters and distance 2 is 100 meters. For distance 1 (see FIG. 7A), 147.5 kV are needed to create an ESF with sufficient strength to alter a path 304 of potentially harmful particles at an angle $\theta_1$ at 10 meters so that the spacecraft 302 is protected from the radiation 25. For distance 2 (see FIG. 7B), 120 kV are needed to create an ESF with sufficient strength to alter a path 304 of potentially harmful particles at an angle $\theta_2$ at 100 meters so that the spacecraft 302 is protected from the radiation.

In another non-limiting example, an ESF generator 100 positioned at 2500 meters from the spacecraft 302 can be powered with about 20 kV to create an ESF with sufficient strength to alter a path of potentially harmful particles from a radiation source 75 to altered path 304. As such, distance and power can be important factors in determining various parameters of an ESF generator 100 for a particular spacecraft 302 and/or application. Another factor, in addition to power determining various parameters of an ESF generator 100 for a particular spacecraft 302 and/or application, can include the distance Dn (e.g., D3, D4, D5, and/or D6) between the wires 112 and 114 of a wire structure 104.

With reference to FIGS. 8A through 8D, various distances Dn (e.g., vertical distance(s) and/or horizontal distance(s)) between the wires 112 and 114 of various wire structures 104 are illustrated. FIGS. 8A through 8D illustrate that the farther the wires 112 and 114 of a wire structure 104 are positioned apart, the greater the amount of power that is needed to generate ESFs of the same or similar strengths.

Figure 8B:
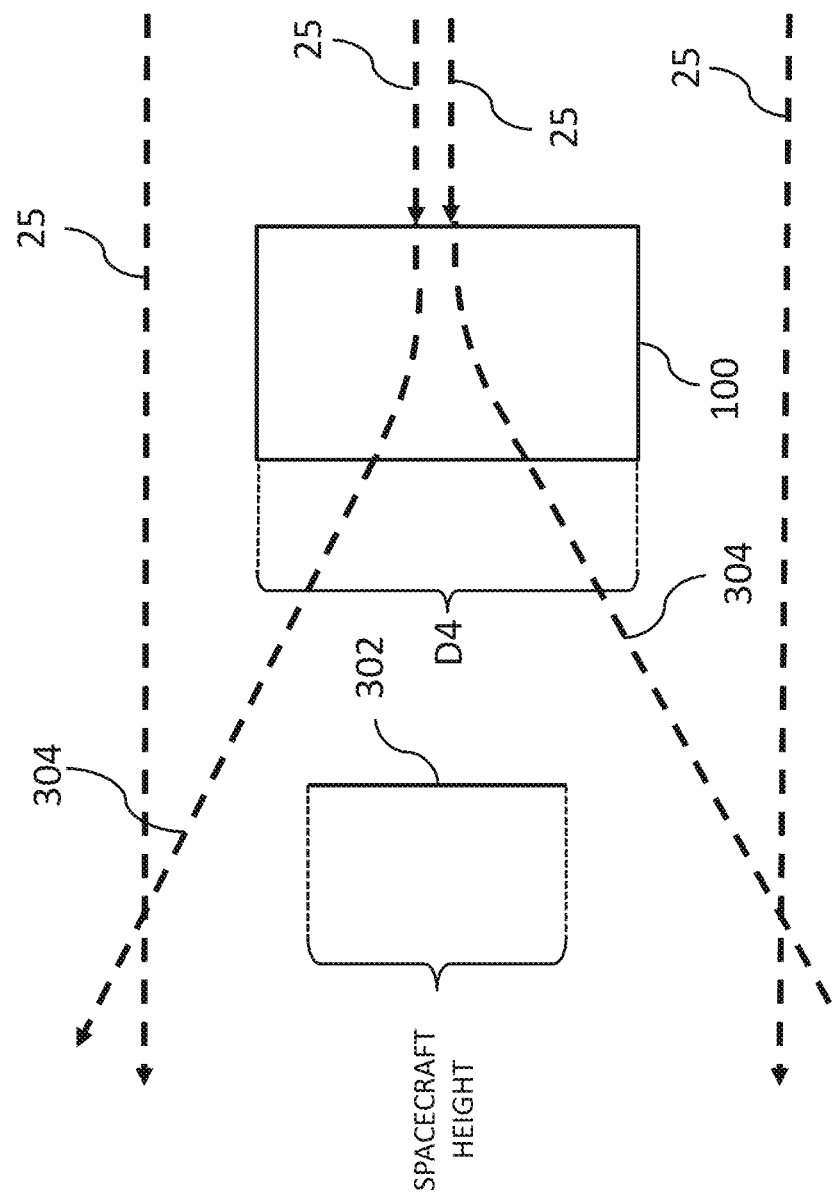
Figure 8C:
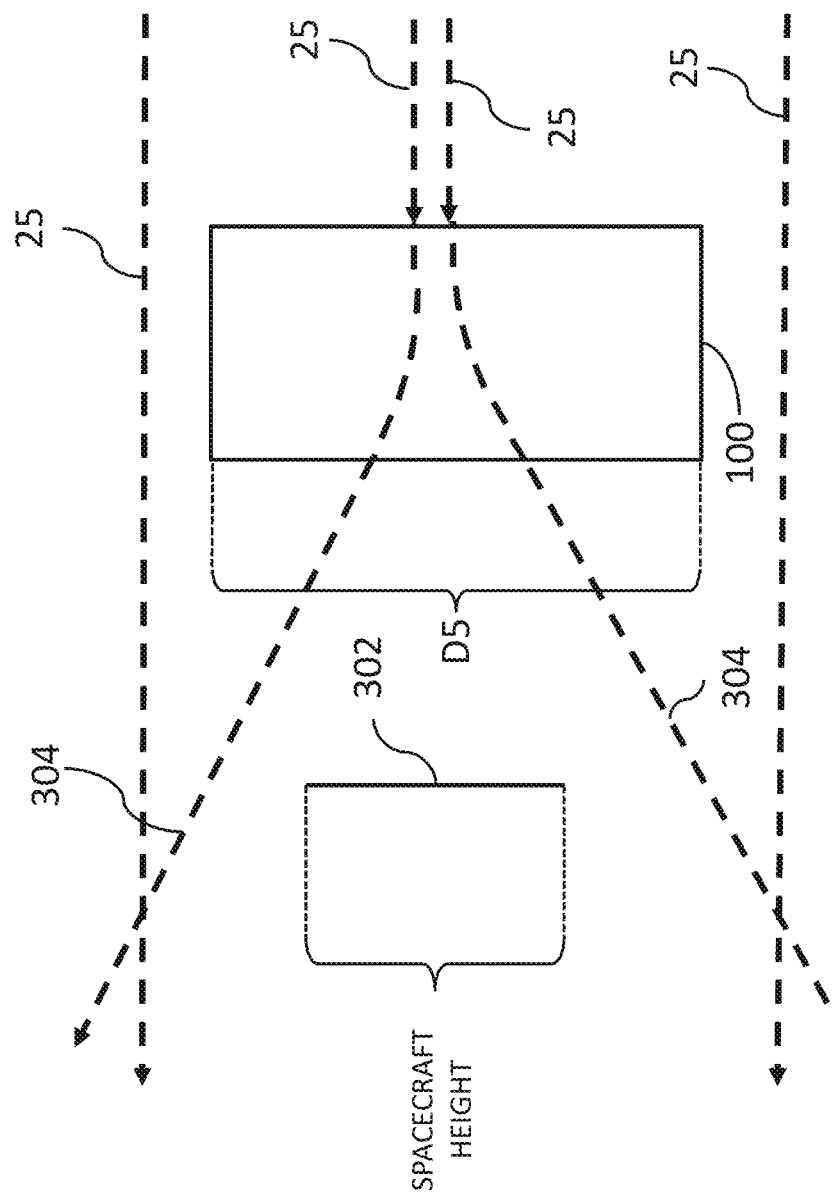
Figure 8D:
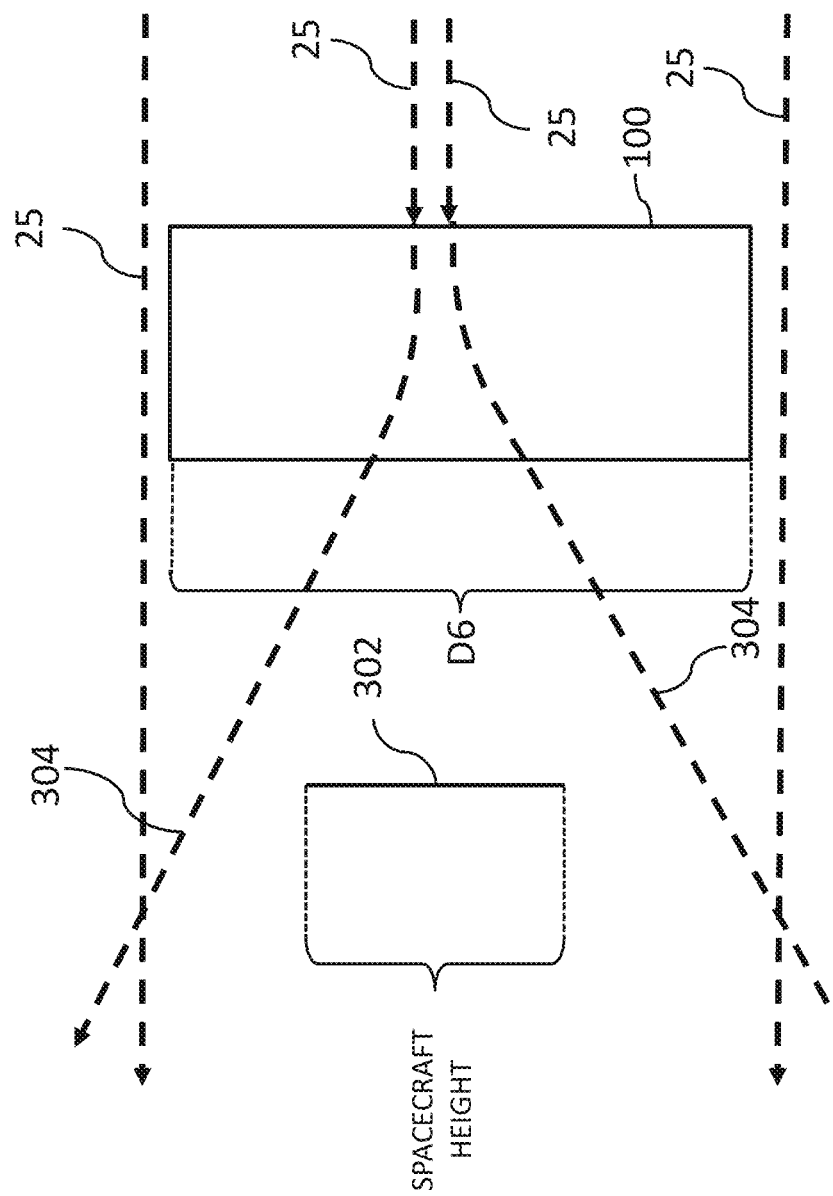

In FIG. 8A, the wires 112 and 114 of a wire structure 104 are spaced a distance D3 (e.g., 20 meters) apart and a first voltage (e.g., 1E5 volts) is needed to generate an ESF with a particular field strength (e.g., a field strength sufficient to deflect up to about 100 MeV protons and/or about 250 MeV protons, among other field strengths that are possible and contemplated herein). In FIG. 8B, the wires 112 and 114 of a wire structure 104 are spaced a greater distance D4 (e.g., 40 meters) apart and a higher second voltage (e.g., 2E5 volts) is needed to generate an ESF with the same particular field strength. In FIG. 8C, the wires 112 and 114 of a wire structure 104 are spaced an even greater distance D5 (e.g., 60 meters) apart and an even higher third voltage (e.g., 3E5 volts) is needed to generate an ESF with the same particular field strength. Finally, in FIG. 8D, the wires 112 and 114 of a wire structure 104 are spaced a distance D6 (e.g., 80 meters) apart, greater than the distance D5, and a fourth voltage (e.g., 4E5 volts), greater than the third voltage, is needed to generate an ESF with the same particular field strength. Other field strengths and/or distances may require greater amounts or smaller amounts of voltage to generate an ESF for a particular spacecraft 302 and/or application.

The description of FIGS. 8A through 8D include specific distance values; however, the various embodiments are not limited to such values. Further, it should be noted that FIGS. 8A through 8D are not to scale and are not to be used to limit the scope of the various embodiments illustrated therein.

Figure 9A:
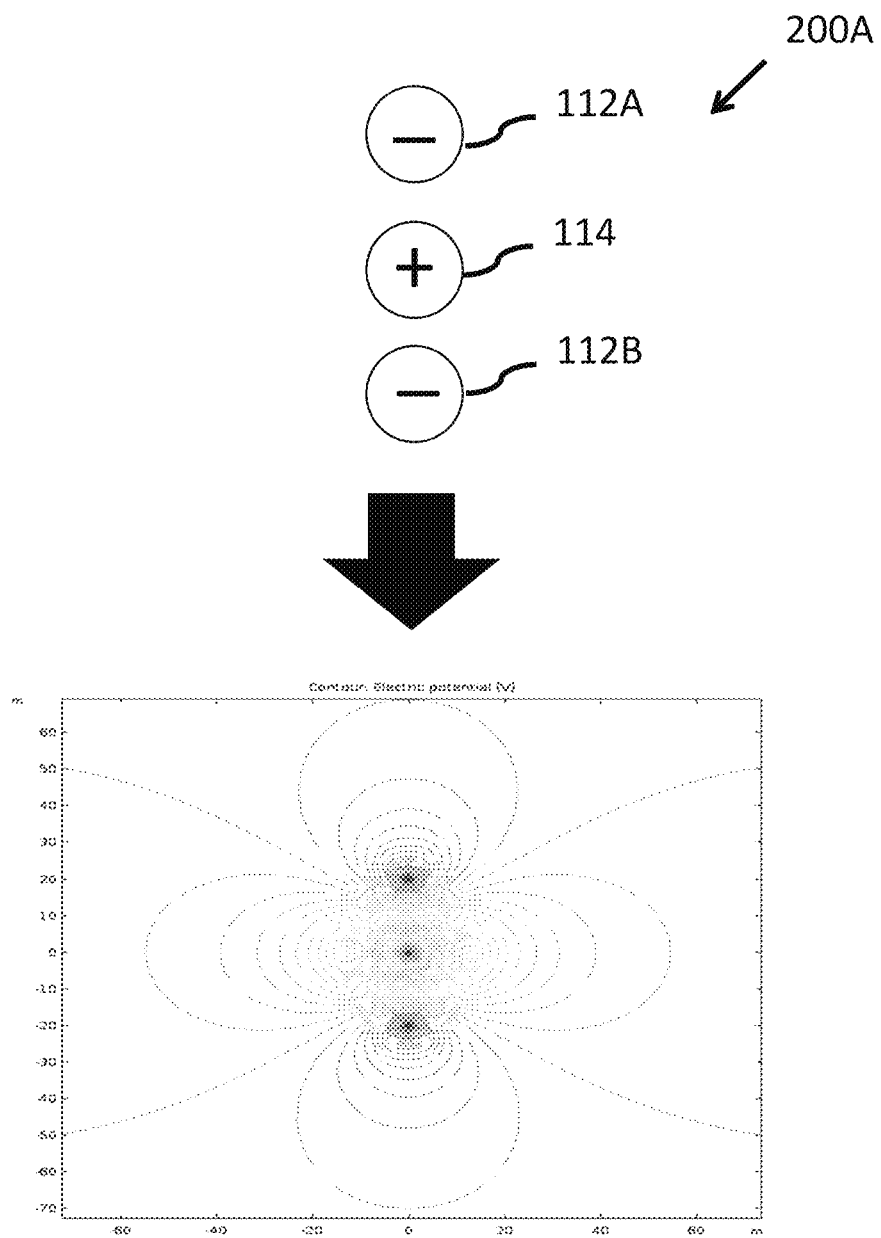
FIGS. 9A through 9C are diagrams illustrating respective ESFs generated by various wire structures of an ESF generator of FIG. 1, according to various embodiments of the present disclosure.
Figure 9B:
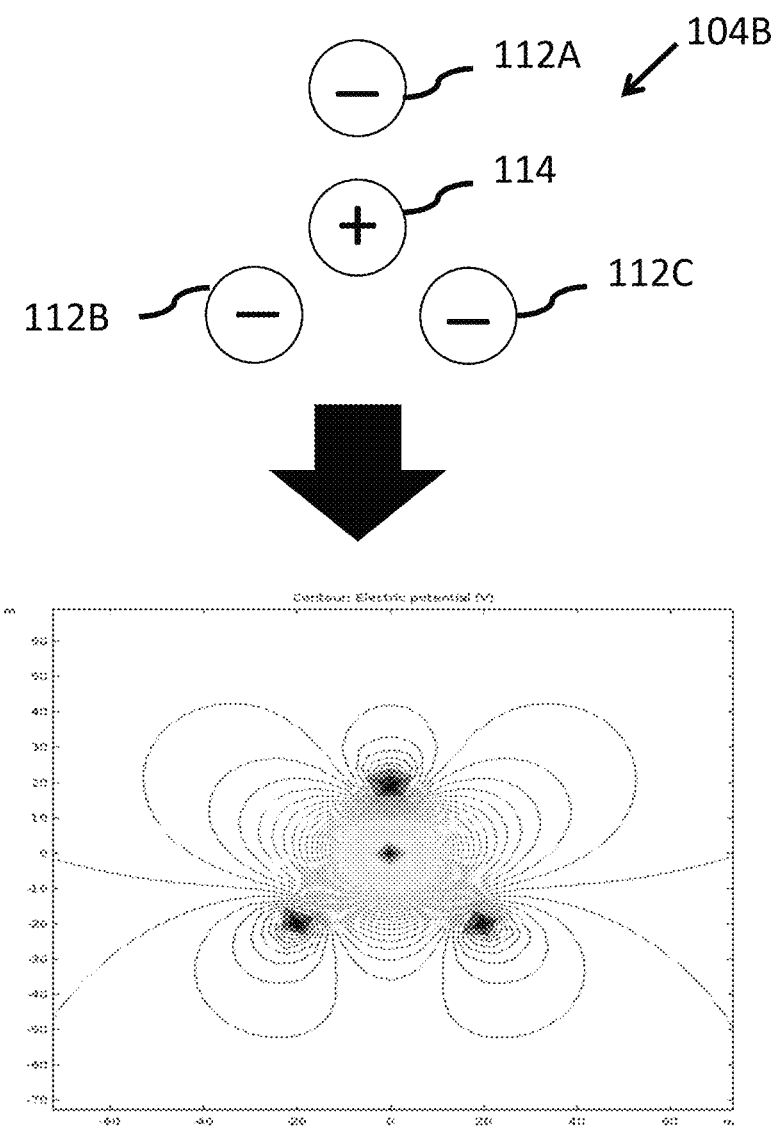
Figure 9C:
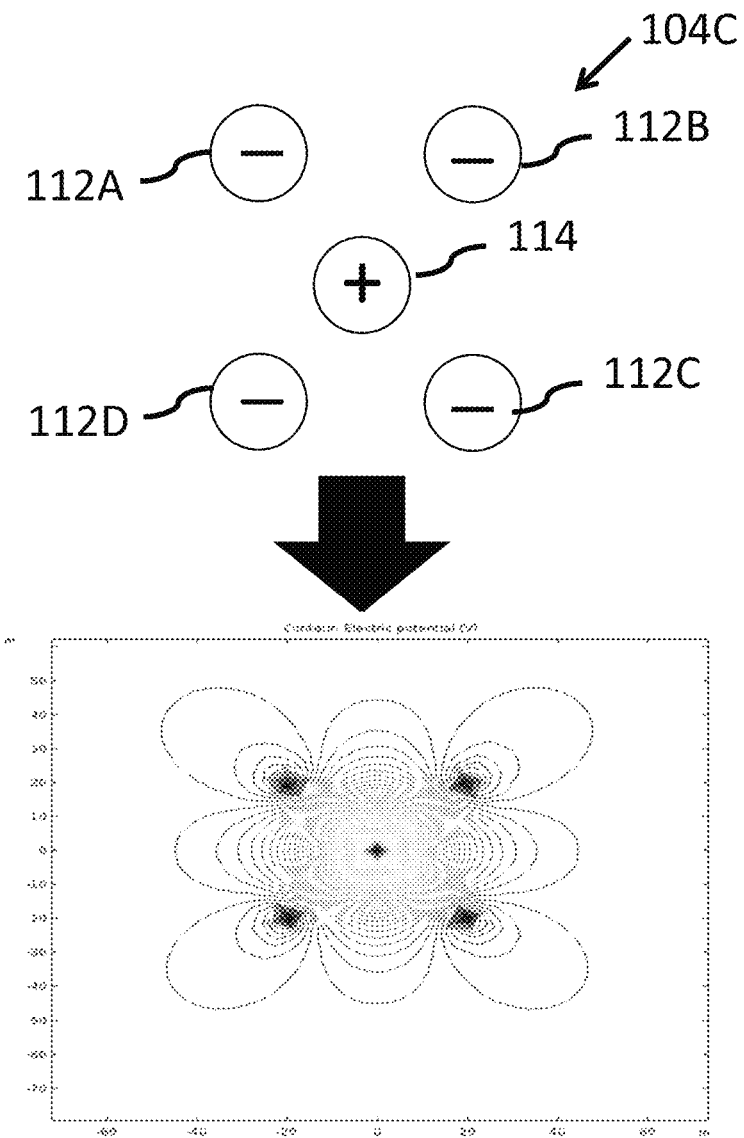

With reference to FIGS. 9A through 9C, FIGS. 9A through 9C are diagrams illustrating ESFs generated by various embodiments of a wire structure 104 when power is applied to the wire structure 104. FIG. 9A illustrates an ESF generated by a wire structure 104A to alter the path 304 when power is supplied to the wire structure 104A. Here, the wire(s) 112 and/or wire(s) 114 of structure 104A can come out of the drawing page and the ESF can include a field characterized by a shape resembling a cross.

FIG. 9B illustrates an ESF generated by a wire structure 104B to alter the path 304 when power is supplied to the wire structure 104B. Here, the wire(s) 112 and/or wire(s) 114 of structure 104B can come out of the drawing page and the ESF can include a field characterized by a shape resembling a butterfly.

FIG. 9C illustrates an ESF generated by a wire structure 104C to alter the path 304 when power is supplied to the wire structure 104C. Here, the wire(s) 112 and/or wire(s) 114 of structure 104C can come out of the drawing page and the ESF can include a field characterized by a shape resembling a flower.

Figure 10:
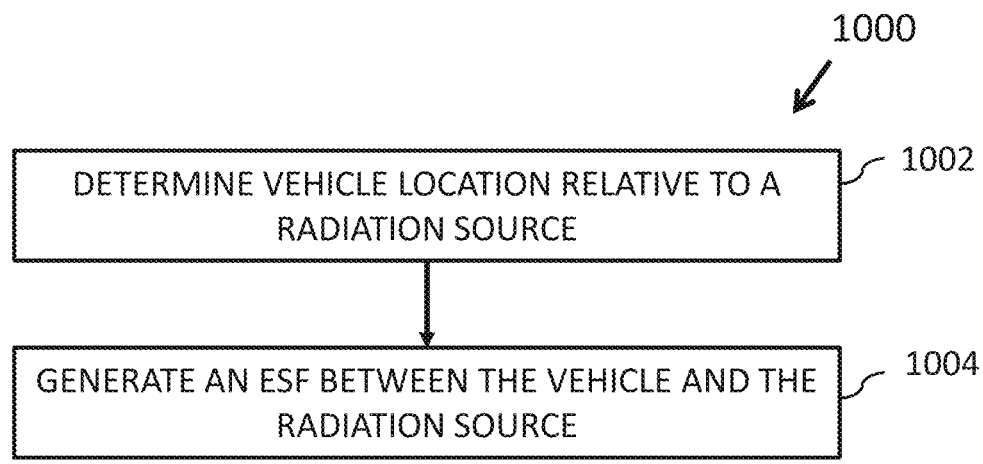
FIG. 10 is a schematic flow chart of a method of generating an ESF to protect a vehicle from radiation released from a radiation source, according to one or more examples of the present disclosure.

Referring to FIG. 10, FIG. 10 is a flow diagram of one embodiment of a method 1000 for generating an ESF to protect a vehicle (e.g., a spacecraft 302) from radiation released from a radiation source 75 (e.g., the sun). At least in the illustrated embodiment, the method 900 begins by determining the location of the spacecraft 302 relative to the radiation source 75 (block 1002) and generating (e.g., via an ESF generator 100) an ESF between the spacecraft 302 and the radiation source 75 (block 1004).

An ESF positioned between the spacecraft 302 and the radiation source 75 can repel, deflect, and/or displace the radiation away from the spacecraft 302 to protect the spacecraft 302 from potentially harmful particles. Further, the ESF can alter the path 25 of radiation to an altered path 304 in an effort to shield and/or provide a shield for the spacecraft 302 from the radiation.

Figure 11:
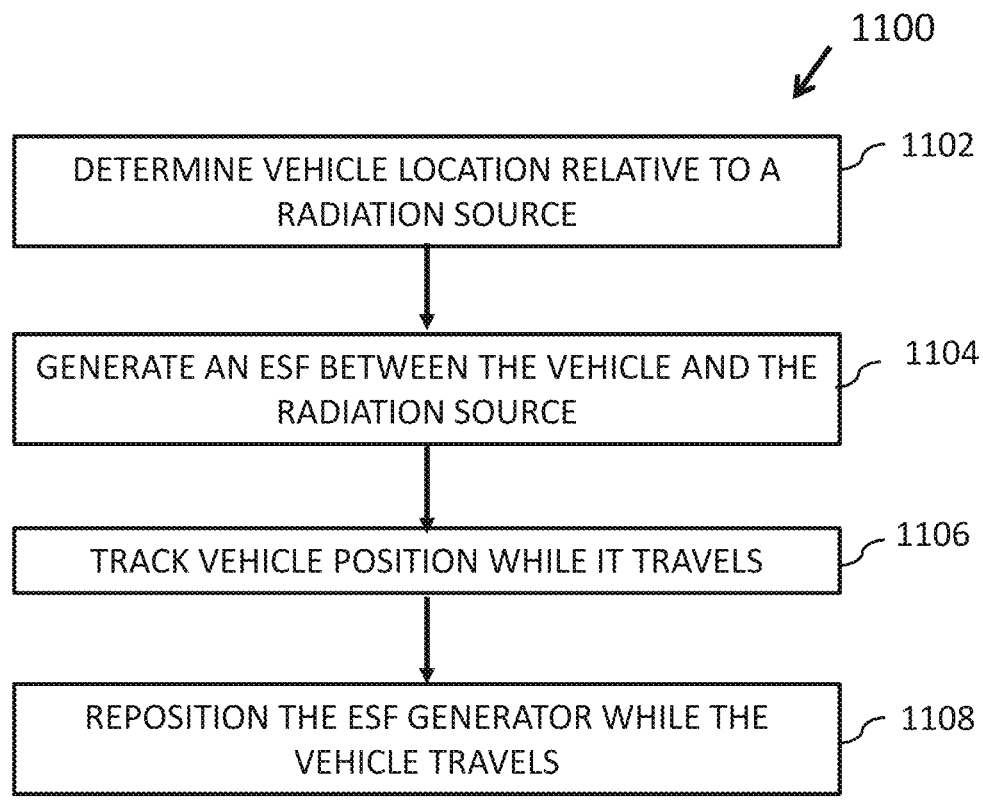
FIG. 11 is a schematic flow chart of another method of generating an ESF to protect a vehicle from radiation released from a radiation source, according to one or more examples of the present disclosure.

With reference to FIG. 11, FIG. 11 is a flow diagram of another embodiment of a method 1100 for generating an ESF to protect a vehicle (e.g., a spacecraft 302) from radiation released from a radiation source 75 (e.g., the sun). At least in the illustrated embodiment, the method 1100 begins by determining the location of the spacecraft 302 relative to the radiation source 75 (block 1102) and generating (e.g., via an ESF generator 100) an ESF between the spacecraft 302 and the radiation source 75 to alter the path 25 of the radiation to an alter path 304 (block 1104).

The method 1100 can further include tracking the location of the spacecraft 302 relative to the radiation source 75 as the spacecraft 302 travels (block 1106). In response to the position of the radiation source 75 changing relative to the spacecraft 302 (e.g., as a result of the spacecraft 302 moving and/or changing positions), the ESF generator 100 is repositioned relative to the spacecraft 302 and the radiation source 75 to maintain the ESF between the spacecraft 302 and the radiation source 75 to alter the path 25 of the radiation to an altered path 304 (block 1108).

An ESF being positioned and continuing to be positioned (e.g., via a tracking module 108 and/or a positioning module 110) between the spacecraft 302 and the radiation source 75 can alter the path 25 of the radiation and/or continue to repel/deflect/displace the radiation away from the spacecraft 302 to protect the spacecraft 302 from potentially harmful particles. That is, the ESF can shield and/or provide a shield for the spacecraft 302 from the radiation as the spacecraft continues to travel to its destination.

In the above description, certain terms may be used such as "up," "down," "upper," "lower," "horizontal," "vertical," "left," "right," "over," "under" and the like. These terms are used, where applicable, to provide some clarity of description when dealing with relative relationships. But, these terms are not intended to imply absolute relationships, positions, and/or orientations. For example, with respect to an object, an "upper" surface can become a "lower" surface simply by turning the object over. Nevertheless, it is still the same object. Further, the terms "including," "comprising," "having," and variations thereof mean "including but not limited to" unless expressly specified otherwise. An enumerated listing of items does not imply that any or all of the items are mutually exclusive and/or mutually inclusive, unless expressly specified otherwise. The terms "a," "an," and "the" also refer to "one or more" unless expressly specified otherwise. Further, the term "plurality" can be defined as "at least two." Moreover, unless otherwise noted, as defined herein a plurality of particular features does not necessarily mean every particular feature of an entire set or class of the particular features.

Additionally, instances in this specification where one element is "coupled" to another element can include direct and indirect coupling. Direct coupling can be defined as one element coupled to and in some contact with another element. Indirect coupling can be defined as coupling between two elements not in direct contact with each other, but having one or more additional elements between the coupled elements. Further, as used herein, securing one element to another element can include direct securing and indirect securing. Additionally, as used herein, "adjacent" does not necessarily denote contact. For example, one element can be adjacent another element without being in contact with that element.

As used herein, the phrase "at least one of", when used with a list of items, means different combinations of one or more of the listed items may be used and only one of the items in the list may be needed. The item may be a particular object, thing, or category. In other words, "at least one of" means any combination of items or number of items may be used from the list, but not all of the items in the list may be required. For example, "at least one of item A, item B, and item C" may mean item A; item A and item B; item B; item A, item B, and item C; or item B and item C. In some cases, "at least one of item A, item B, and item C" may mean, for example, without limitation, two of item A, one of item B, and ten of item C; four of item B and seven of item C; or some other suitable combination.

Unless otherwise indicated, the terms "first," "second," etc. are used herein merely as labels, and are not intended to impose ordinal, positional, or hierarchical requirements on the items to which these terms refer. Moreover, reference to, e.g., a "second" item does not require or preclude the existence of, e.g., a "first" or lower-numbered item, and/or, e.g., a "third" or higher-numbered item.

As used herein, a system, apparatus, structure, article, element, component, or hardware "configured to" perform a specified function is indeed capable of performing the specified function without any alteration, rather than merely having potential to perform the specified function after further modification. In other words, the system, apparatus, structure, article, element, component, or hardware "configured to" perform a specified function is specifically selected, created, implemented, utilized, programmed, and/or designed for the purpose of performing the specified function. As used herein, "configured to" denotes existing characteristics of a system, apparatus, structure, article, element, component, or hardware which enable the system, apparatus, structure, article, element, component, or hardware to perform the specified function without further modification. For purposes of this disclosure, a system, apparatus, structure, article, element, component, or hardware described as being "configured to" perform a particular function may additionally or alternatively be described as being "adapted to" and/or as being "operative to" perform that function.

The schematic flow chart diagrams included herein are generally set forth as logical flow chart diagrams. As such, the depicted order and labeled steps are indicative of one embodiment of the presented method. Other steps and methods may be conceived that are equivalent in function, logic, or effect to one or more steps, or portions thereof, of the illustrated method. Additionally, the format and symbols employed are provided to explain the logical steps of the method and are understood not to limit the scope of the method. Although various arrow types and line types may be employed in the flow chart diagrams, they are understood not to limit the scope of the corresponding method. Indeed, some arrows or other connectors may be used to indicate only the logical flow of the method. For instance, an arrow may indicate a waiting or monitoring period of unspecified duration between enumerated steps of the depicted method. Additionally, the order in which a particular method occurs may or may not strictly adhere to the order of the corresponding steps shown.

The present subject matter may be embodied in other specific forms without departing from its spirit or essential characteristics. The described embodiments are to be considered in all respects only as illustrative and not restrictive. All changes which come within the meaning and range of equivalency of the claims are to be embraced within their scope.

What is claimed is:

1. An apparatus for protecting a vehicle from a radiation source, comprising:
   a set of one or more first wires; and
   a plurality of second wires located proximate to the set of first wires,
   wherein:
     the set of one or more first wires maintains a positive voltage,
     the plurality of second wires maintains a negative voltage,
     the plurality of second wires includes a greater quantity of wires than the set of one or more first wires,
     the plurality of second wires are arranged around the set of one or more first wires,
     the set of first wires and the plurality of second wires are arranged to generate an electrostatic field (ESF) between the vehicle and the radiation source, and
     the ESF includes a predefined uniform and dense shape configured to deflect harmful particles generated by the radiation source away from the vehicle.

2. The apparatus of claim 1, wherein:
   the plurality of second wires comprises at least three second wires;
   the at least three second wires are arranged to include a triangular pattern;

the set of one or more first wires are located within the triangular pattern; and the predefined uniform and dense shape includes a butterfly shape.

3. The apparatus of claim 1, wherein:
the plurality of second wires comprises at least five second wires;
the at least five second wires are arranged to include a geometric pattern including at least five sides; and
the set of one or more first wires are located within the geometric pattern.

4. The apparatus of claim 1, wherein the set of one or more first wires comprises a plurality of first wires.

5. The apparatus of claim 1, wherein:
the ESF includes first width and height dimensions;
the vehicle includes second width and height dimensions; and
the first width and height dimensions are greater than or equal to the second width and height dimensions.

6. The apparatus of claim 1, wherein
the plurality of second wires includes at least one second wire coiled around the set of one or more first wires.

7. The apparatus of claim 1, wherein
the plurality of second wires includes at least one second wire comprising a mesh configuration around the set of one or more first wires.

8. The apparatus of claim 1, wherein at least two second wires of the plurality of second wires are located on opposite sides of the set of one or more first wires and the predefined uniform and dense shape includes a cross shape.

9. The apparatus of claim 8, wherein the at least two second wires are stacked in parallel with respect to the set of one or more first wires.

10. The apparatus of claim 1, wherein:
the plurality of second wires comprises at least four second wires;
the at least four second wires are arranged to include a quadrilateral pattern;
the set of one or more first wires are located within the quadrilateral pattern; and
the predefined uniform and dense shape includes a flower shape.

11. The apparatus of claim 10, wherein:
the quadrilateral pattern includes a square pattern; and
the set of one or more first wires are located at a center of the square pattern.

12. A system, comprising:
a spacecraft; and
a field generator for protecting the spacecraft from a radiation source, the field generator comprising a set of one or more first wires maintaining a positive voltage and a plurality of second wires maintaining a negative voltage,
wherein:
the plurality of second wires includes a greater quantity of wires than the set of one or more first wires,
the plurality of second wires are arranged around the set of one or more first wires,
the set of one or more first wires and the plurality of second wires are arranged to generate an electrostatic field (ESF), and
the ESF includes a predefined uniform and dense shape configured to deflect harmful particles generated by the radiation source away from the spacecraft.

13. The system of claim 12, further comprising:
a tracking module that tracks a location of the spacecraft relative to the radiation source; and
a positioning module that positions the field generator based on the tracked location of the spacecraft to generate the ESF including the predefined uniform and dense shape between the spacecraft and the radiation source.

14. The system of claim 13, wherein the positioning module is further configured to re-position the field generator relative to the spacecraft and the radiation source as the spacecraft travels to maintain the ESF including the predefined uniform and dense shape between the spacecraft and the radiation source.

15. The system of claim 13, wherein:
at least two second wires of the plurality of second wires are located on opposite sides of the set of one or more first wires; and
the at least two second wires are stacked in parallel with respect to the set of one or more first wires.

16. The system of claim 13, wherein:
the plurality of second wires comprises at least three second wires;
the at least three second wires are arranged to comprise a geometric pattern including at least three sides; and
the set of one or more first wires are located within an area defined by the at least three sides of the geometric pattern.

17. The system of claim 12, wherein:
the predefined uniform and dense shape of the ESF includes first width and height dimensions;
the spacecraft includes second width and height dimensions; and
the first width and height dimensions of the predefined uniform and dense shape of the ESF are greater than or equal to the second width and height dimensions.

18. The system of claim 17, wherein the predefined uniform and dense shape comprises one of a cross shape, a butterfly shape, and a flower shape.

19. A method for protecting a spacecraft from a radiation source, comprising:
tracking a location of the spacecraft relative to the radiation source; and
generating an electrostatic field (ESF) including a predefined uniform and dense shape configured deflect harmful particles generated by the radiation source between the spacecraft and the radiation source,
wherein:
the ESF including the predefined uniform and dense shape is generated via a field generator comprising a set of one or more first wires maintaining a positive voltage and a plurality of second wires maintaining a negative voltage,
the plurality of second wires includes a greater quantity of wires than the set of one or more first wires, and
the plurality of second wires are arranged around the set of one or more first wires.

20. The method of claim 19, further comprising:
re-positioning the field generator relative to the spacecraft and the radiation source as the spacecraft travels to maintain the ESF including the predefined uniform and dense shape between the spacecraft and the radiation source.

* * * * *